(12) United States Patent
Usui et al.

(10) Patent No.: US 10,339,896 B2
(45) Date of Patent: Jul. 2, 2019

(54) HEAD-MOUNTED DISPLAY APPARATUS, AND DISPLAY METHOD

(71) Applicants: Yuuma Usui, Kanagawa (JP); Shigenobu Hirano, Kanagawa (JP); Ikue Kawashima, Kanagawa (JP); Yasuo Katano, Kanagawa (JP); Aino Hasegawa, Kanagawa (JP); Atsushi Ohshima, Kanagawa (JP)

(72) Inventors: Yuuma Usui, Kanagawa (JP); Shigenobu Hirano, Kanagawa (JP); Ikue Kawashima, Kanagawa (JP); Yasuo Katano, Kanagawa (JP); Aino Hasegawa, Kanagawa (JP); Atsushi Ohshima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/531,539

(22) PCT Filed: Jan. 12, 2016

(86) PCT No.: PCT/JP2016/000125
§ 371 (c)(1),
(2) Date: May 30, 2017

(87) PCT Pub. No.: WO2016/114130
PCT Pub. Date: Jul. 21, 2016

(65) Prior Publication Data
US 2017/0345391 A1 Nov. 30, 2017

(30) Foreign Application Priority Data

Jan. 13, 2015 (JP) ................................. 2015-004246
Jan. 23, 2015 (JP) ................................. 2015-010958
(Continued)

(51) Int. Cl.
G09G 5/00 (2006.01)
G02B 27/00 (2006.01)
(Continued)

(52) U.S. Cl.
CPC ............. G09G 5/10 (2013.01); G02B 27/017 (2013.01); G02B 27/0172 (2013.01);
(Continued)

(58) Field of Classification Search
CPC .............................. G09G 5/10; G02B 27/0172
(Continued)

(56) References Cited

U.S. PATENT DOCUMENTS 4,432,622 A 2/1984 Kawashima et al.
5,991,075 A 11/1999 Katsuragawa et al.
(Continued)

FOREIGN PATENT DOCUMENTS

CN 1926605 3/2007
EP 2662723 11/2013
(Continued)

OTHER PUBLICATIONS

Partial supplementary European search report for EP16737201.0 dated Dec. 1, 2017.
(Continued)

Primary Examiner — Hai Tao Sun
(74) Attorney, Agent, or Firm — IPUSA, PLLC

(57) ABSTRACT

A head-mounted display apparatus (1) includes an image display part (10) configured to display an image, an optical unit (20, 30, 50) configured to lead the image to an eye of a wearer of the display apparatus (1), a light intensity detector (60) configured to detect light intensity (A) of external light, a dimmer filter (40) configured to vary transmittance to adjust the intensity (B) of the external light reaching the eye of the wearer, and a controller (70) con-
(Continued)

figured to adjust the transmittance of the dimmer filter (40) and the light intensity (C) of a light source of the image display part (10) based on the light intensity (A) of the external light obtained by the light intensity detector (60).

9 Claims, 23 Drawing Sheets

(30) Foreign Application Priority Data

Oct. 7, 2015 (JP) ................................ 2015-199416
Oct. 7, 2015 (JP) ................................ 2015-199417

(51) Int. Cl.
*G09G 5/10* (2006.01)
*G09G 3/00* (2006.01)
*G02B 27/01* (2006.01)
*G02F 1/15* (2019.01)
*H04N 5/64* (2006.01)

(52) U.S. Cl.
CPC ....... *G09G 3/001* (2013.01); *G02B 2027/014* (2013.01); *G02B 2027/0118* (2013.01); *G02B 2027/0178* (2013.01); *G02F 1/15* (2013.01); *G09G 2320/06* (2013.01); *G09G 2320/066* (2013.01); *G09G 2320/0626* (2013.01); *G09G 2330/021* (2013.01); *G09G 2354/00* (2013.01); *G09G 2360/144* (2013.01); *H04N 5/64* (2013.01)

(58) Field of Classification Search
USPC ....................................................... 345/589
See application file for complete search history.

(56) References Cited

U.S. PATENT DOCUMENTS

| | | |
|---|---|---|
| 6,456,438 B1 | 9/2002 | Lee et al. |
| 6,480,345 B2 | 11/2002 | Kawashima et al. |
| 6,707,514 B2 | 3/2004 | Kondoh et al. |
| 8,179,423 B2 | 5/2012 | Maruyama et al. |
| 8,829,133 B2 | 9/2014 | Usui et al. |
| 9,563,058 B2 | 2/2017 | Hotta et al. |
| 2005/0212824 A1 | 9/2005 | Marcinkiewicz et al. |
| 2006/0197832 A1* | 9/2006 | Yamada ............... G02B 27/017 348/77 |
| 2013/0147859 A1 | 6/2013 | Kobayashi |
| 2013/0300766 A1* | 11/2013 | Mukawa ............ G02B 27/0172 345/633 |
| 2015/0370075 A1 | 12/2015 | Ato et al. |
| 2016/0071485 A1* | 3/2016 | Tripathi .................. G09G 5/10 345/589 |

FOREIGN PATENT DOCUMENTS

| | | |
|---|---|---|
| JP | H06-070268 | 3/1994 |
| JP | H07-121093 | 5/1995 |
| JP | H08-160340 | 6/1996 |
| JP | H10-104549 | 4/1998 |
| JP | H11-202256 | 7/1999 |
| JP | 3371156 | 1/2003 |
| JP | 2003-508808 | 3/2003 |
| JP | 2005-284007 | 10/2005 |
| JP | 2006-154437 | 6/2006 |
| JP | 2006-309314 | 11/2006 |
| JP | 2007-086716 | 4/2007 |
| JP | 4366944 | 11/2009 |
| JP | 2012-008290 | 1/2012 |
| JP | 2013-122519 | 6/2013 |
| JP | 2014-044334 | 3/2014 |
| WO | 2012/101778 | 8/2012 |
| WO | 2014/129109 | 8/2014 |

OTHER PUBLICATIONS

International Search Report dated Mar. 29, 2016 in PCT/JP2016/000125 filed on Jan. 12, 2016.
Office Action dated Jan. 30, 2019 issued with respect to the corresponding Chinese Patent Application No. 201680005434.8.

\* cited by examiner

[Fig. 1]
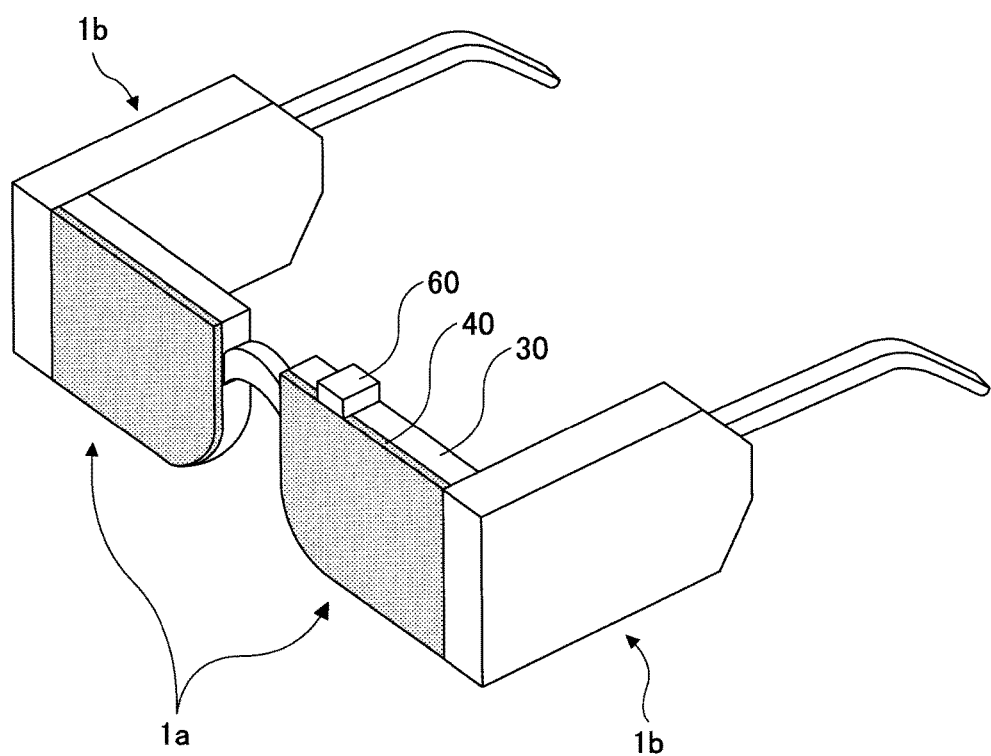

[Fig. 2]
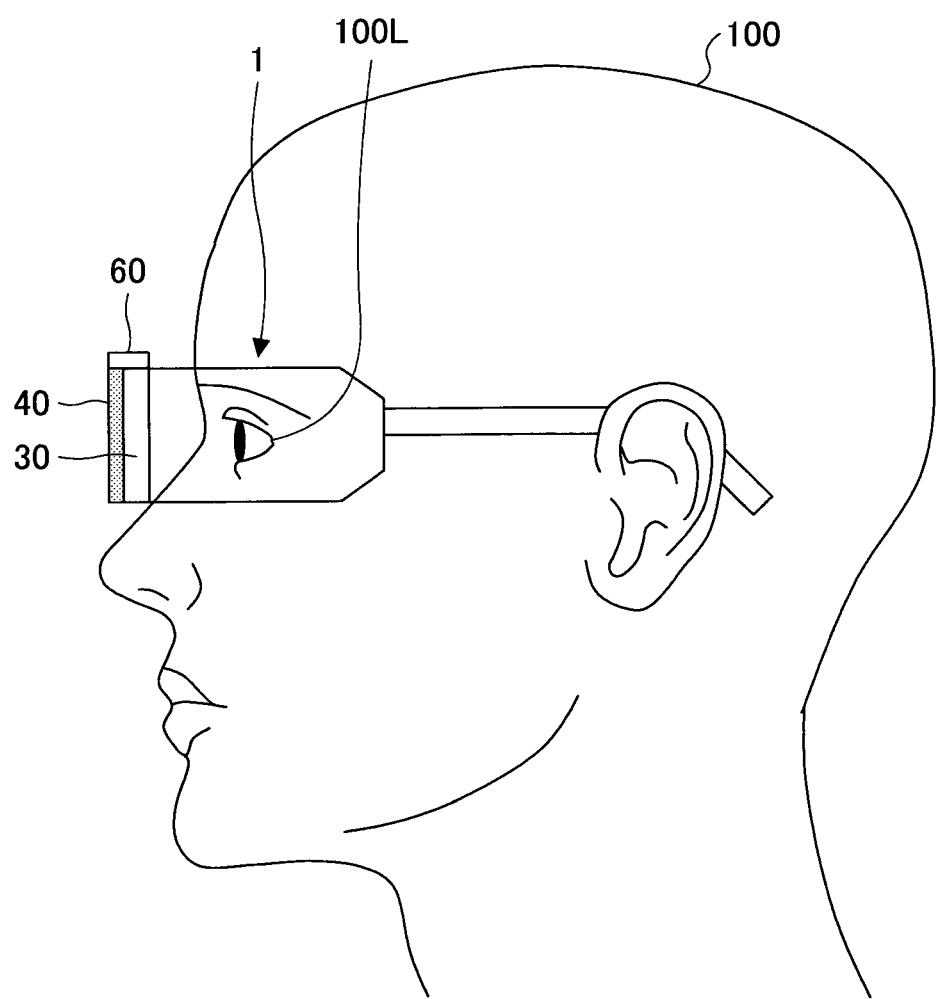

[Fig. 3]
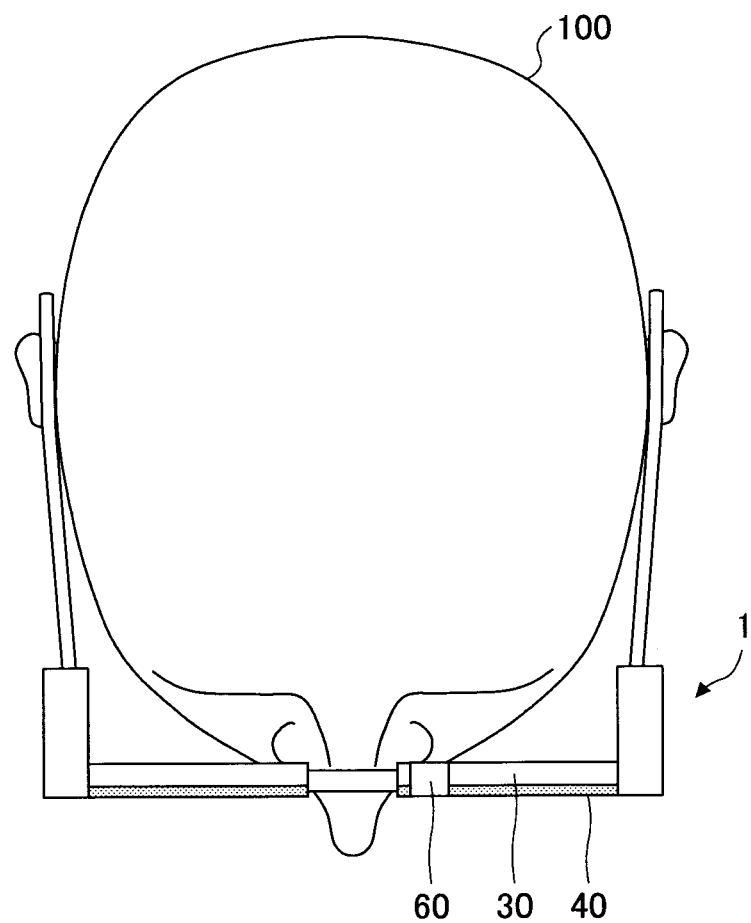

[Fig. 4]
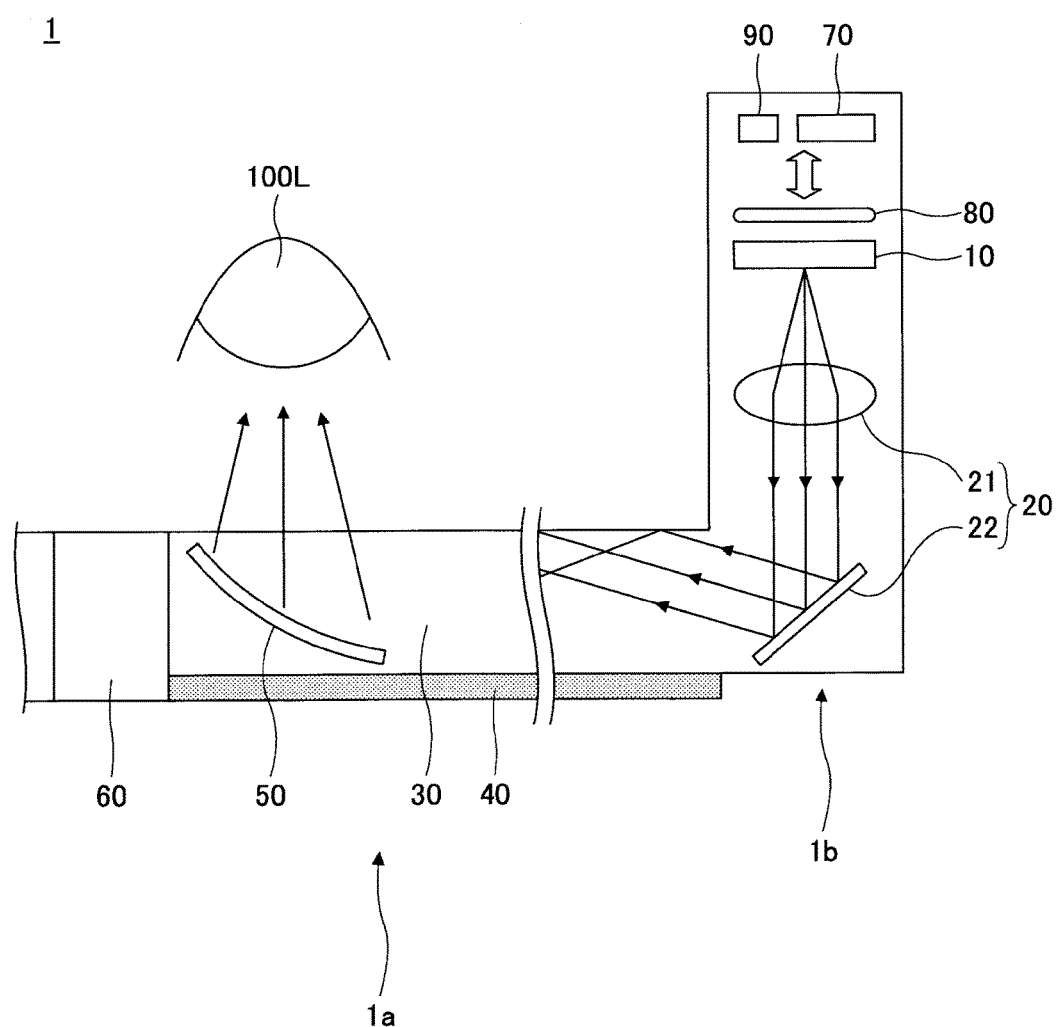

[Fig. 5]
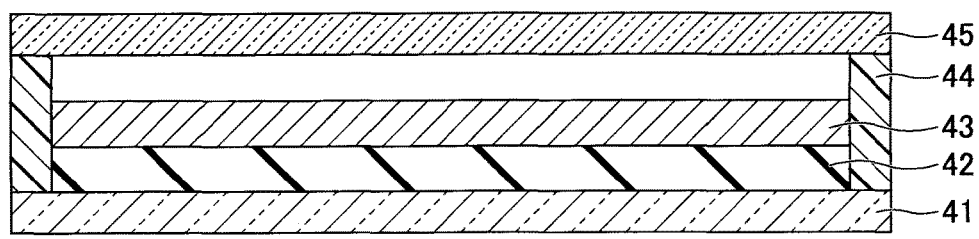
[Fig. 6]
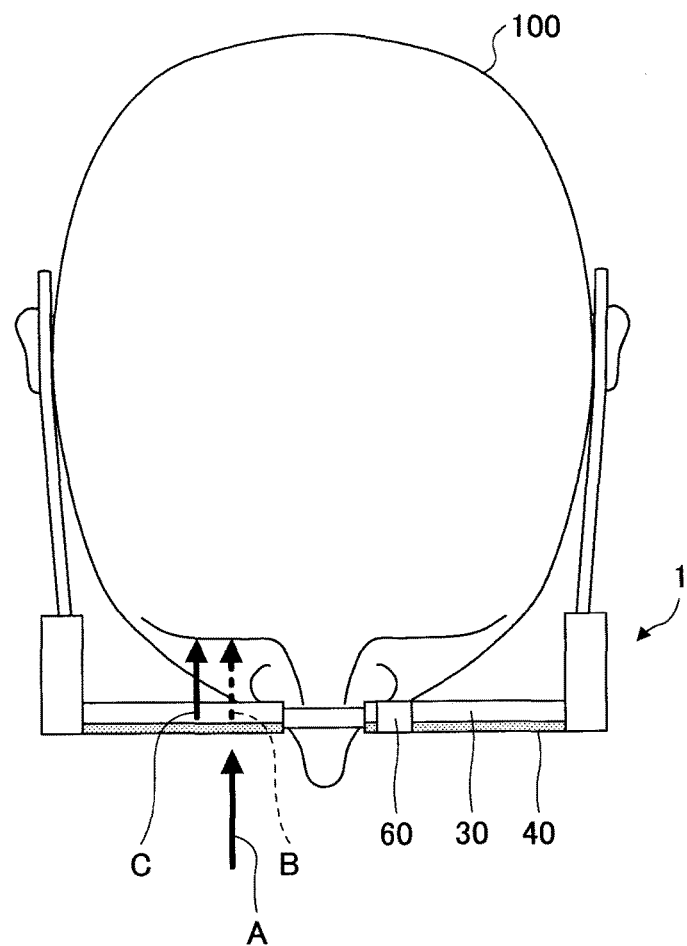

[Fig. 7]
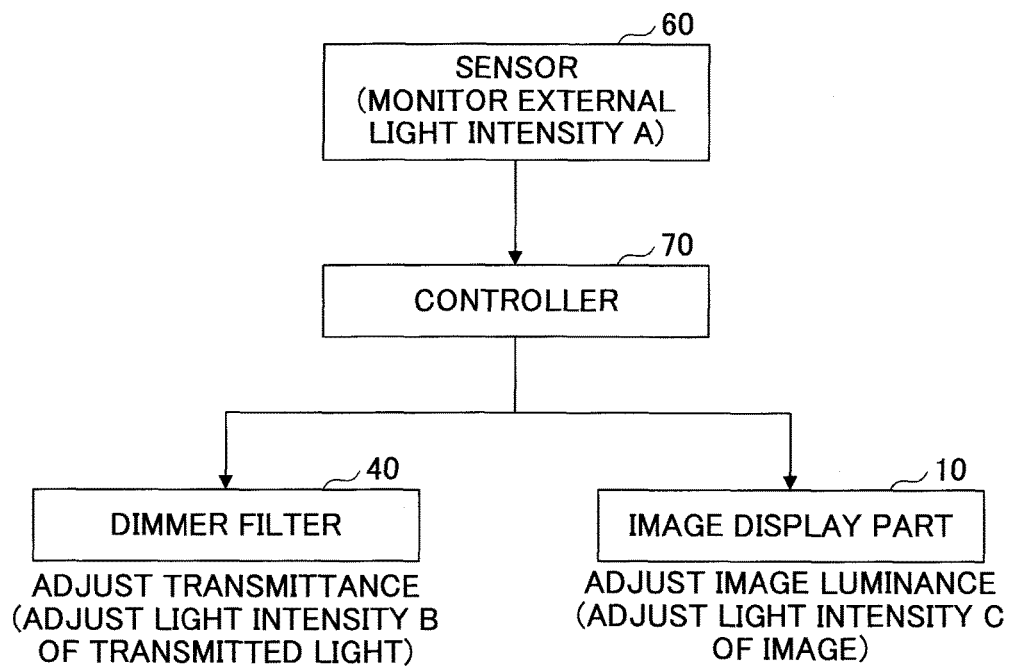
[Fig. 8]
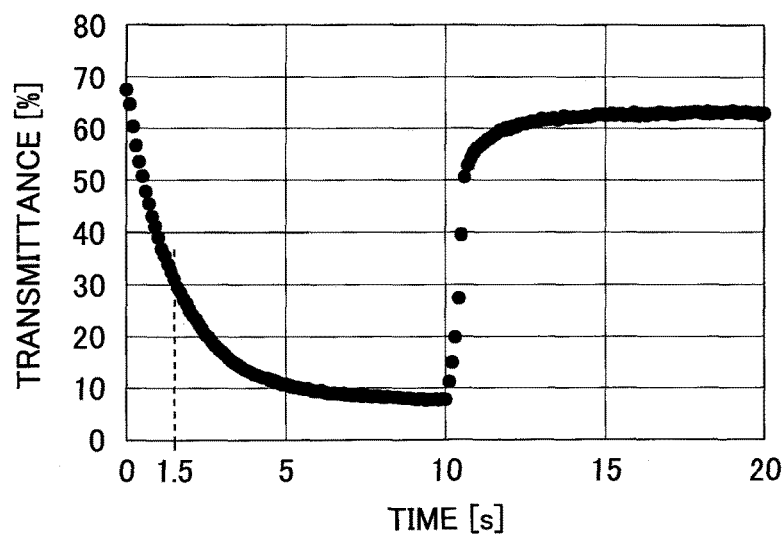

[Fig. 9]
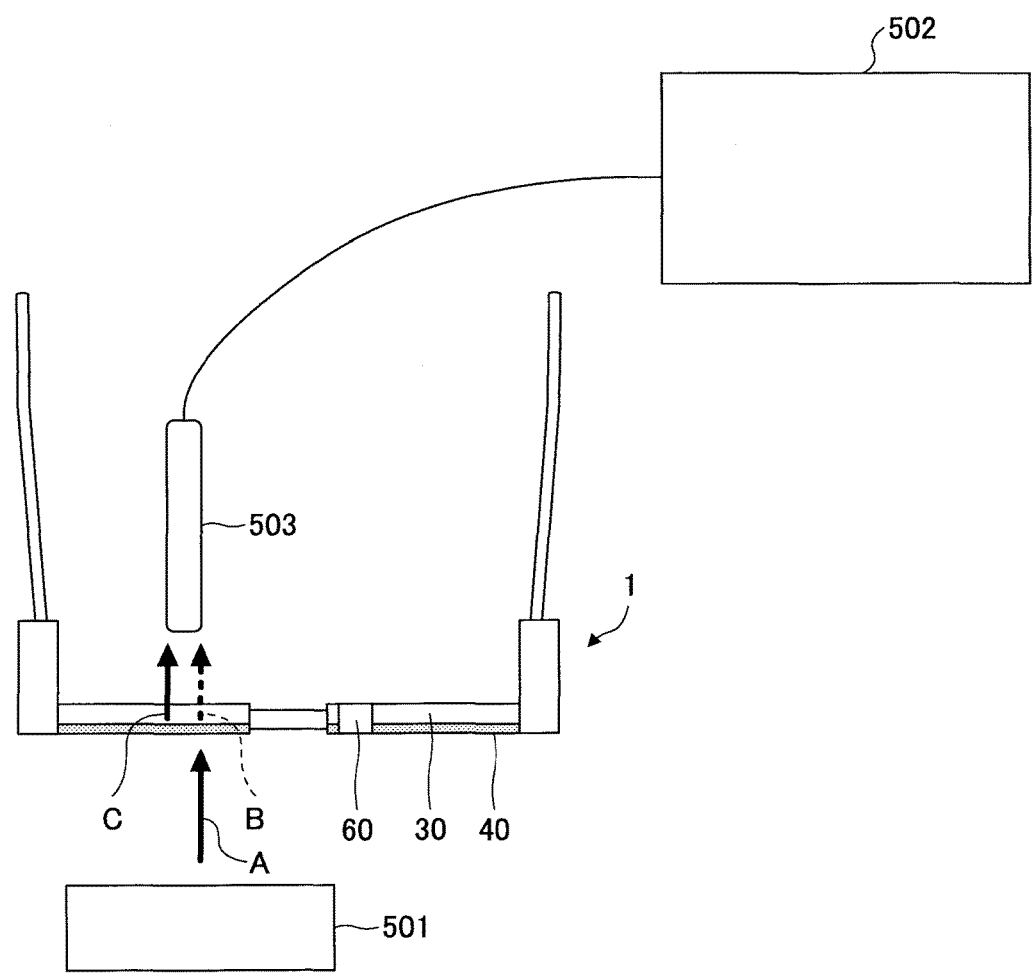

[Fig. 10]
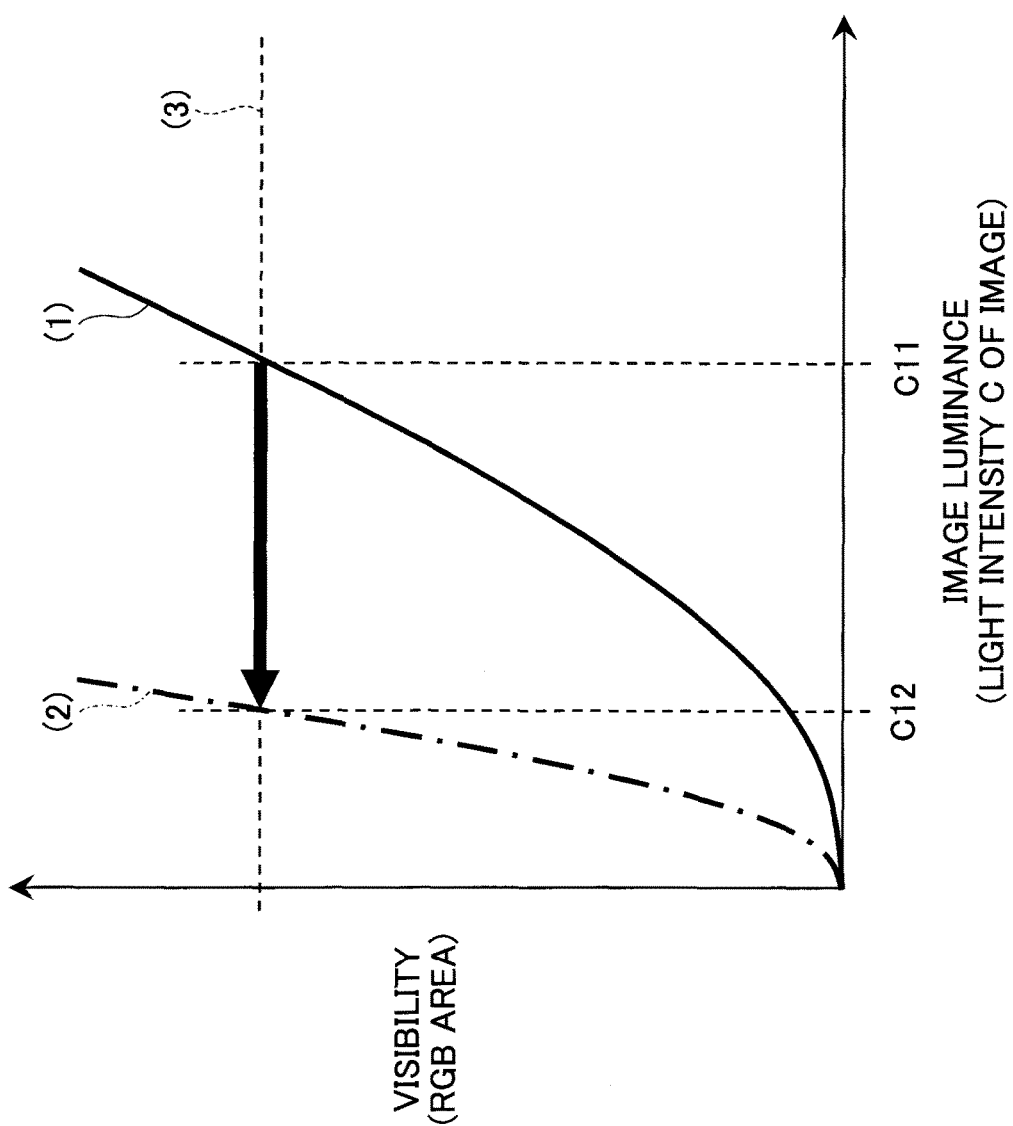

[Fig. 11]
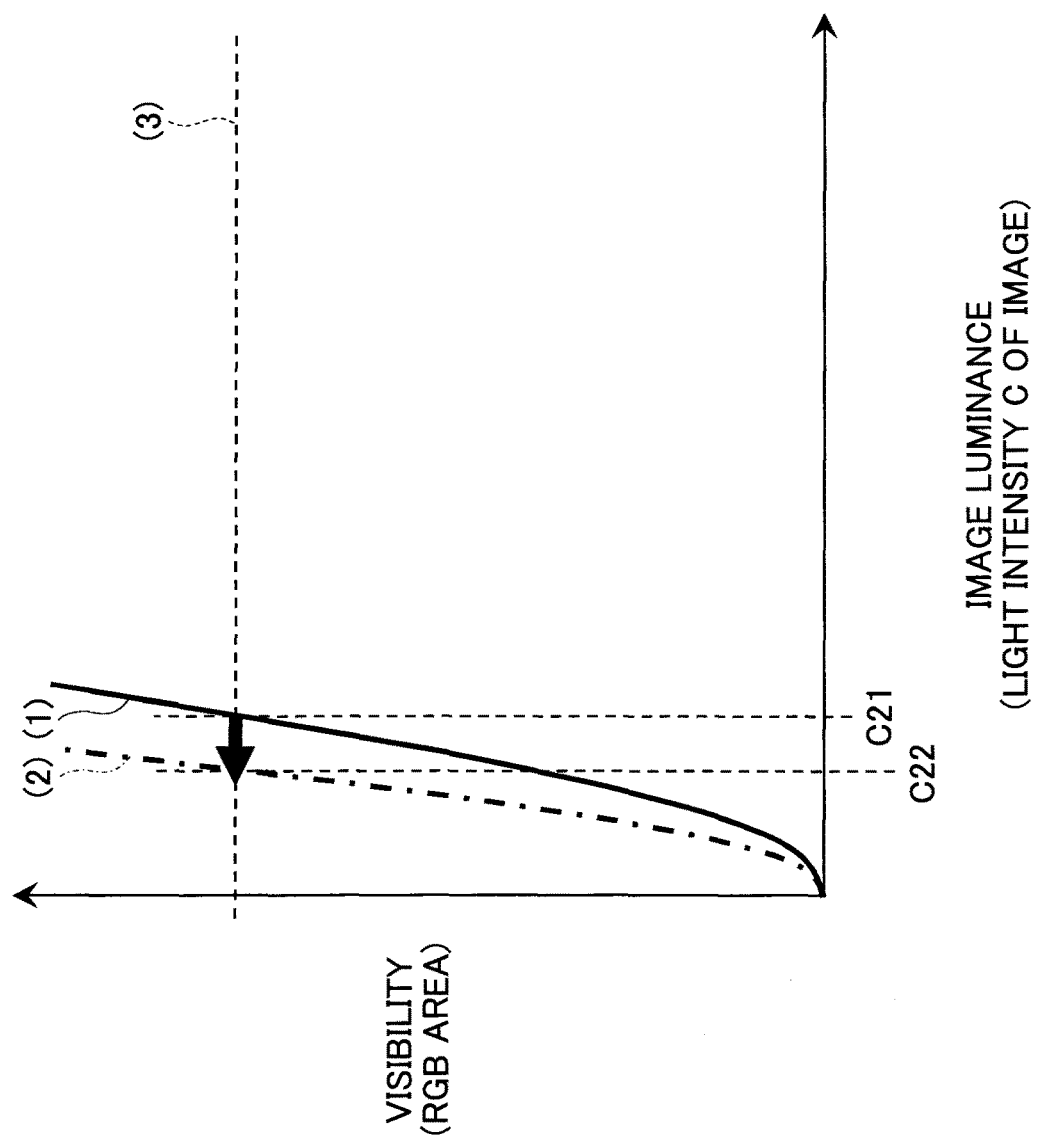

[Fig. 12]
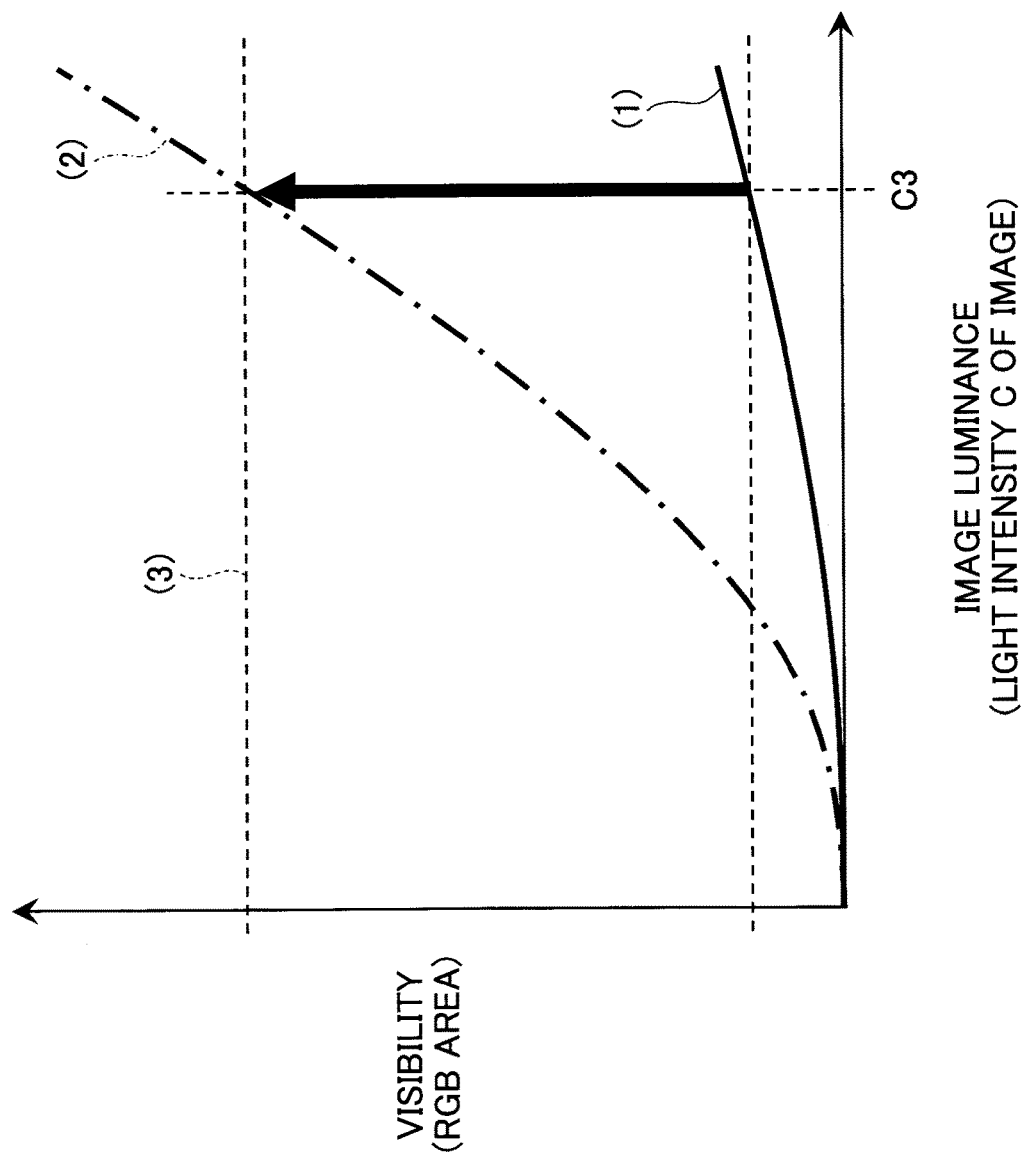

[Fig. 13]

| EXTERNAL LIGHT INTENSITY A (lx) | TRANSMITTANCE OF DIMMER FILTER | LIGHT INTENSITY B OF TRANSMITTED LIGHT (lx) | IMAGE LUMINANCE (LIGHT INTENSITY C, lx OF IMAGE) |
|---|---|---|---|
| – 100 | 80% | – 80 | – 300 |
| 100 – 200 | 60% | 60 – 120 | 300 |
| 200 – 400 | 30% | 60 – 120 | 300 |
| 400 – 600 | 20% | 80 – 120 | 300 |
| 600 – 800 | 15% | 90 – 120 | 300 |
| 800 – 1,000 | 10% | 80 – 100 | 300 |
| 1,000 – 2,000 | 10% | 100 – 200 | 400 |
| 2,000 – 3,000 | 10% | 200 – 300 | 600 |
| 3,000 – 5,000 | 10% | 300 – 500 | 800 |
| 5,000 – 7,000 | 10% | 500 – 700 | 1,000 |
| 7,000 – 10,000 | 10% | 700 – 1,000 | 1,300 |
| 10,000 – 20,000 | 10% | 1,000 – 2,000 | 2,600 |
| 20,000 – 30,000 | 10% | 2,000 – 3,000 | 4,500 |
| 30,000 – | 10% | 3,000 – | 4,500 – |

[Fig. 14]
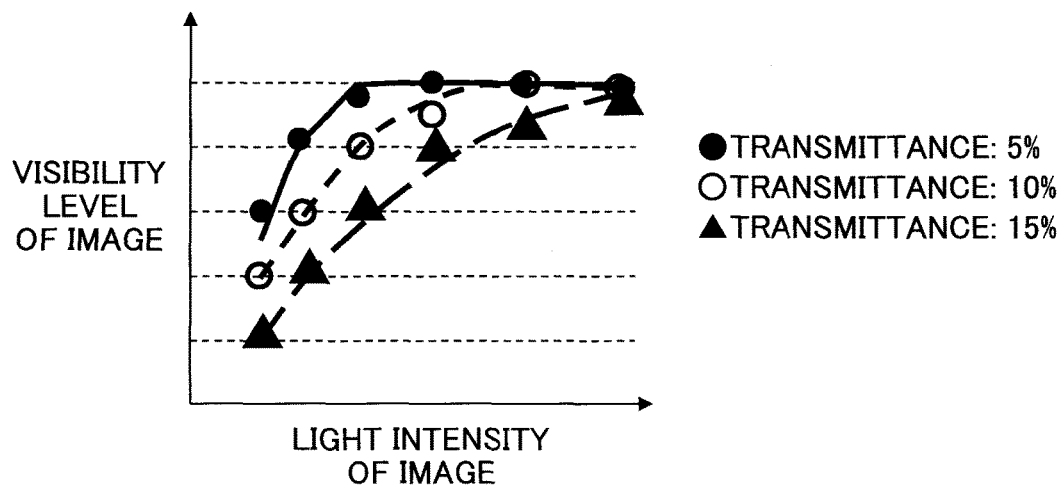
[Fig. 15]
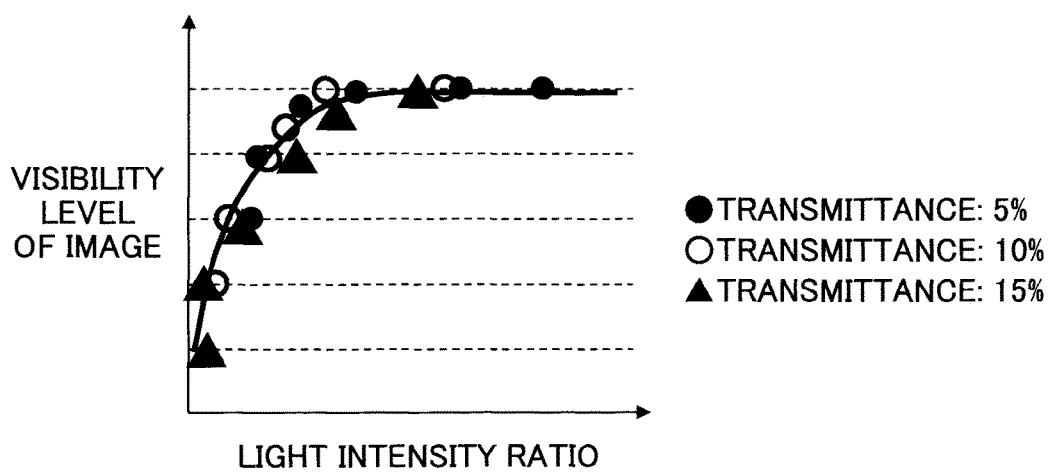

[Fig. 16]
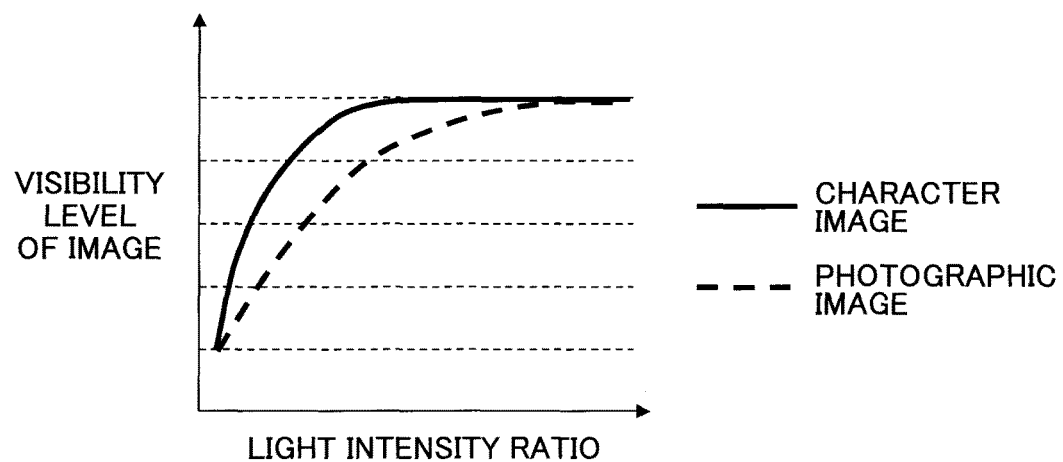
[Fig. 17]
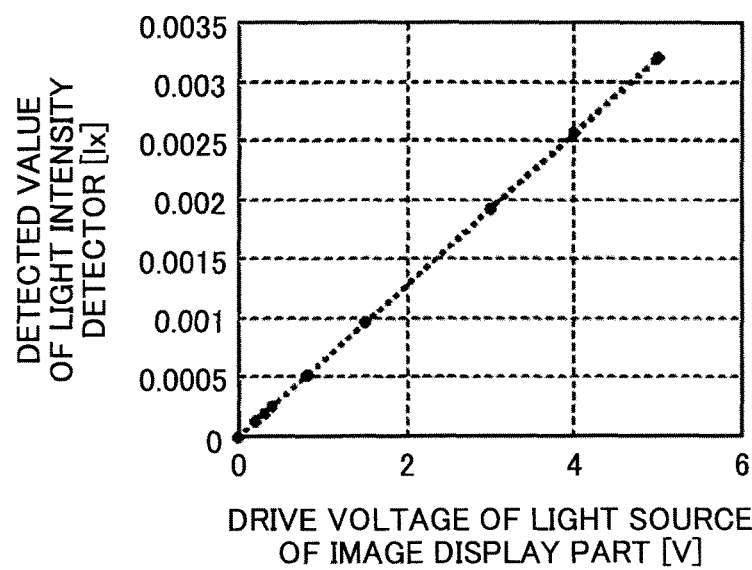

[Fig. 18]
| OUTPUT VALUE OF IMAGE DISPLAY PART SENSOR | OUTPUT VALUE OF SENSOR | NECESSARY FILTER TRANSMITTANCE | EC DRIVE VOLTAGE |
|---|---|---|---|
| 0.0001V | 0.0800V | 7% | 2.9230V |
| 0.0002V | 0.0800V | 10% | 2.7845V |
| 0.0003V | 0.0800V | 14% | 2.6460V |
| 0.0005V | 0.4000V | 6% | 2.9784V |
| 0.0010V | 0.4000V | 10% | 2.7845V |
| 0.0019V | 0.4000V | 21% | 2.3690V |
| 0.0019V | 0.8832V | 9% | 2.8236V |
| 0.0026V | 0.8832V | 13% | 2.6982V |
| 0.0032V | 0.8832V | 16% | 2.5727V |
[Fig. 19]
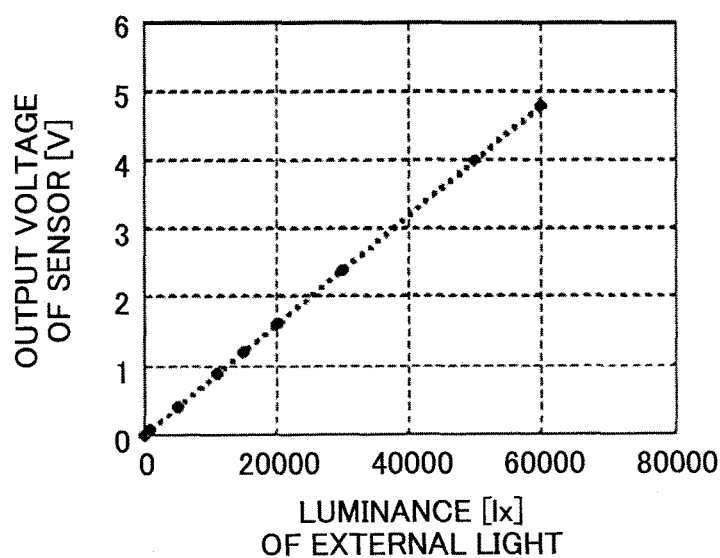

[Fig. 20]
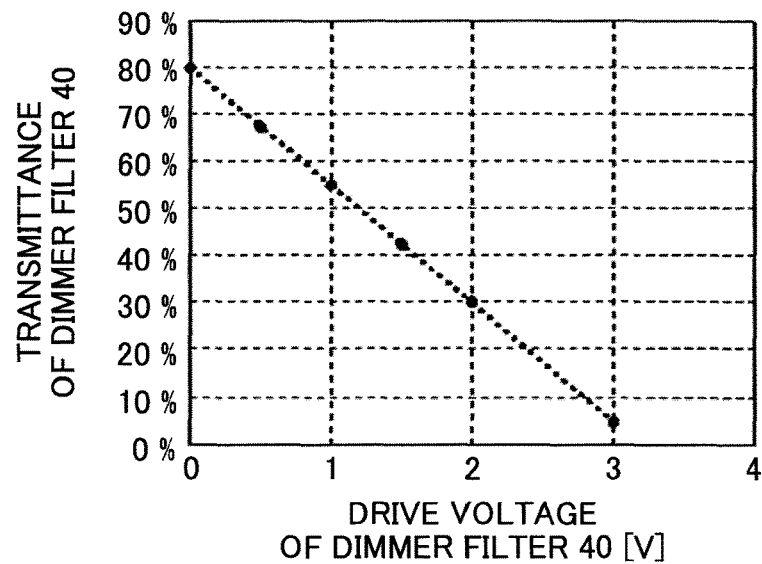
[Fig. 21]
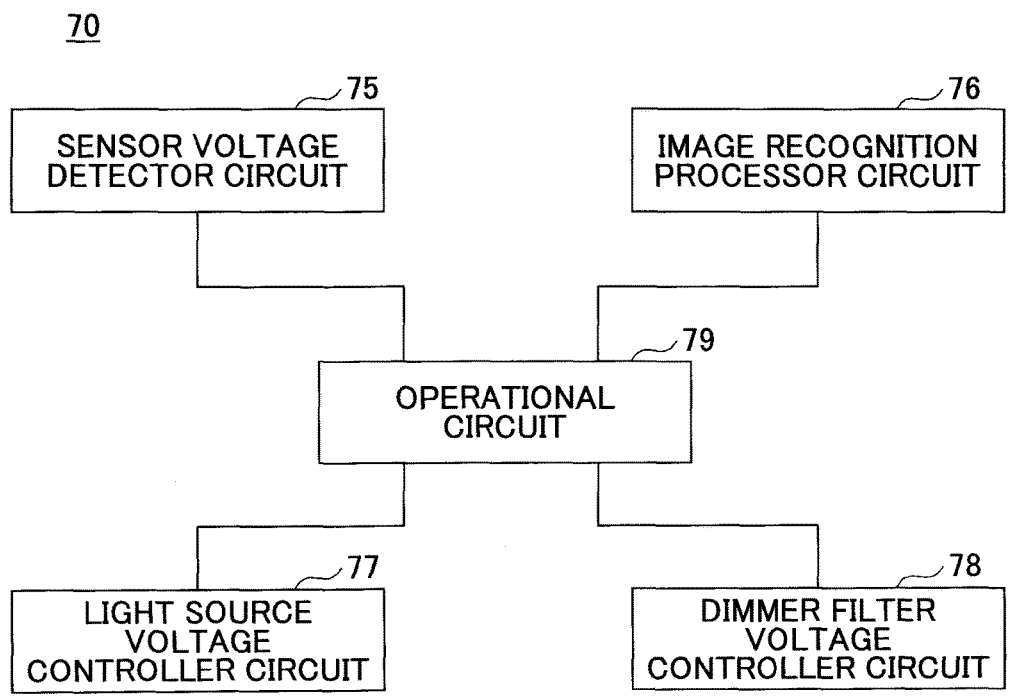

[Fig. 22A]
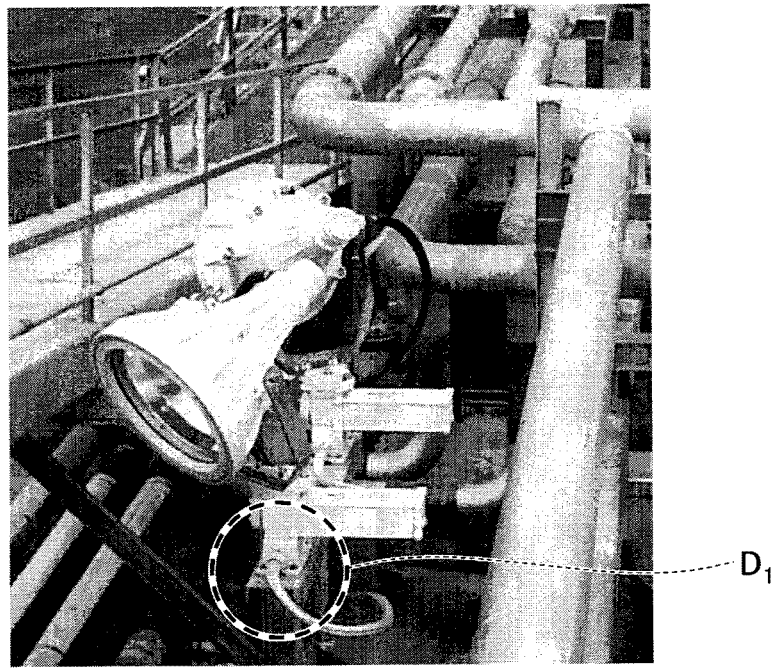
[Fig. 22B]
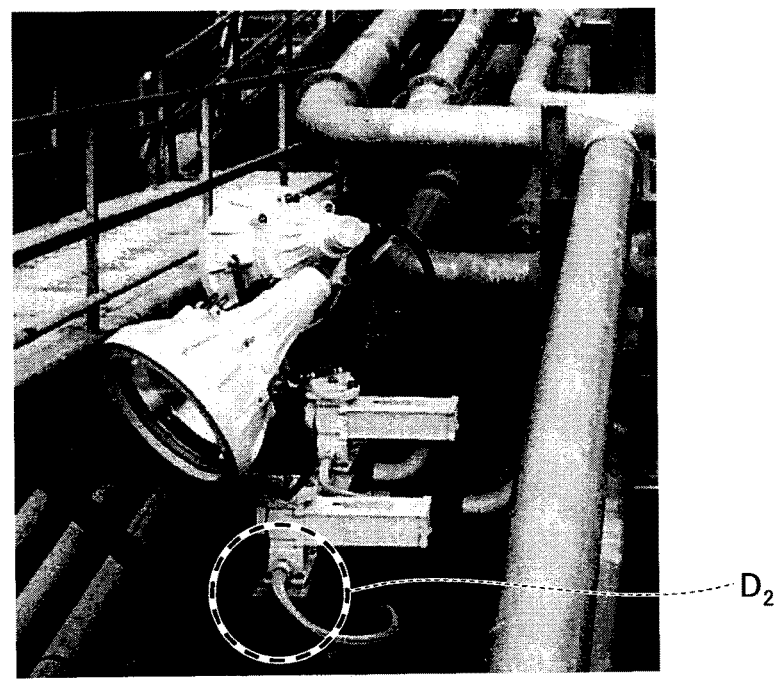

[Fig. 23]
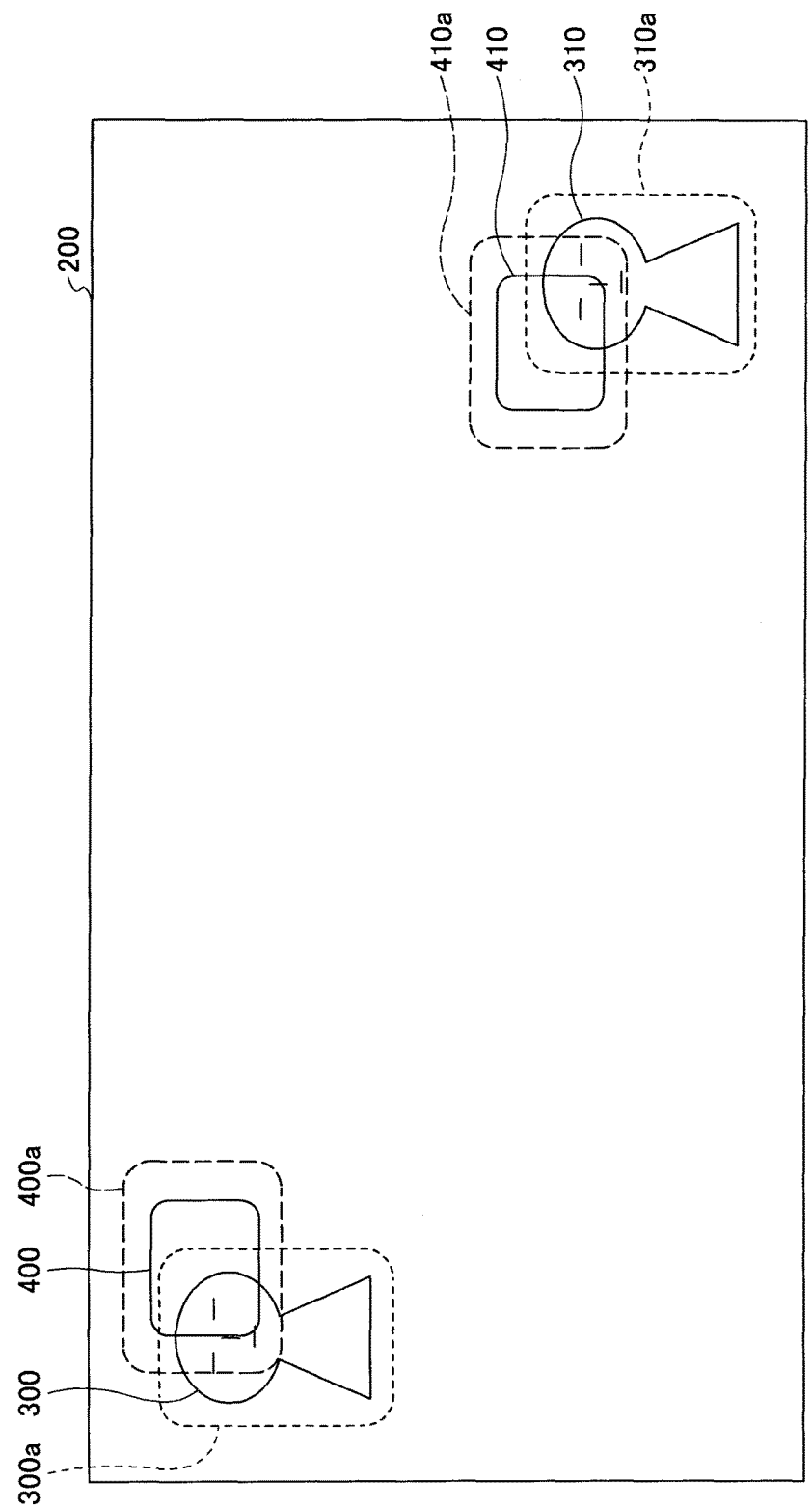

[Fig. 24]
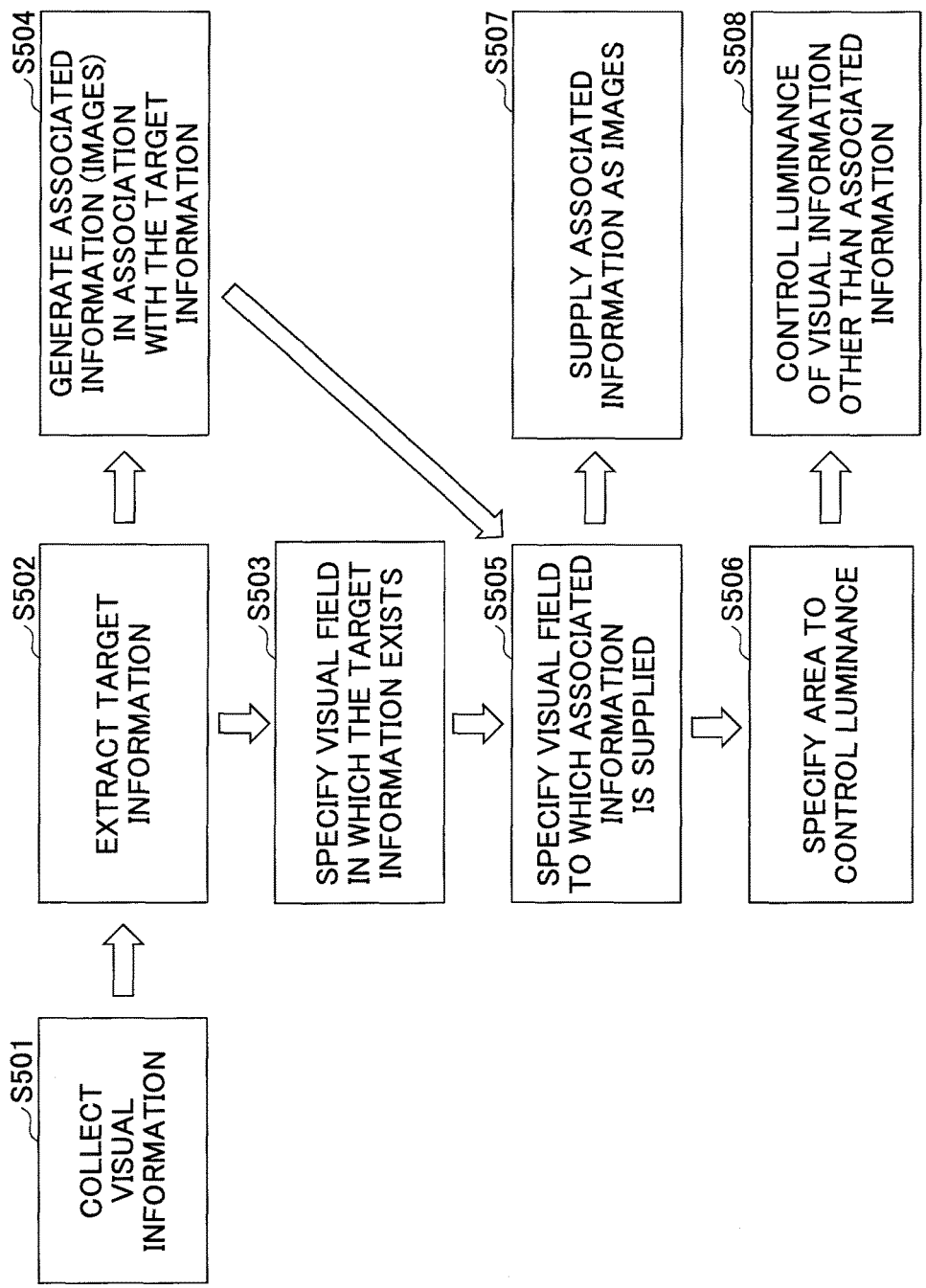

[Fig. 25]
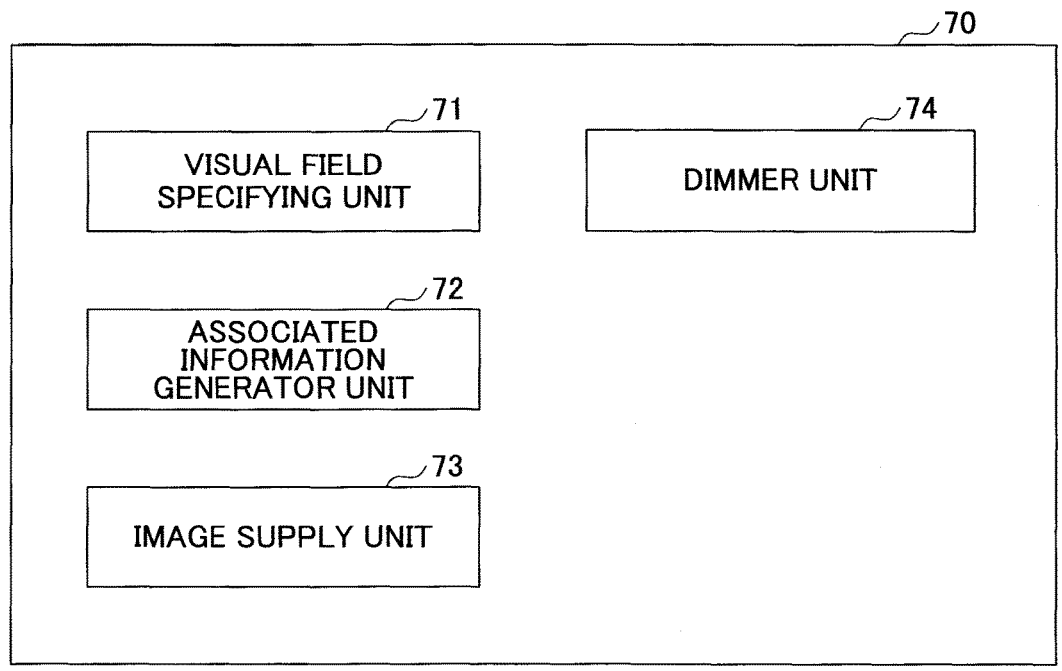

[Fig. 26]
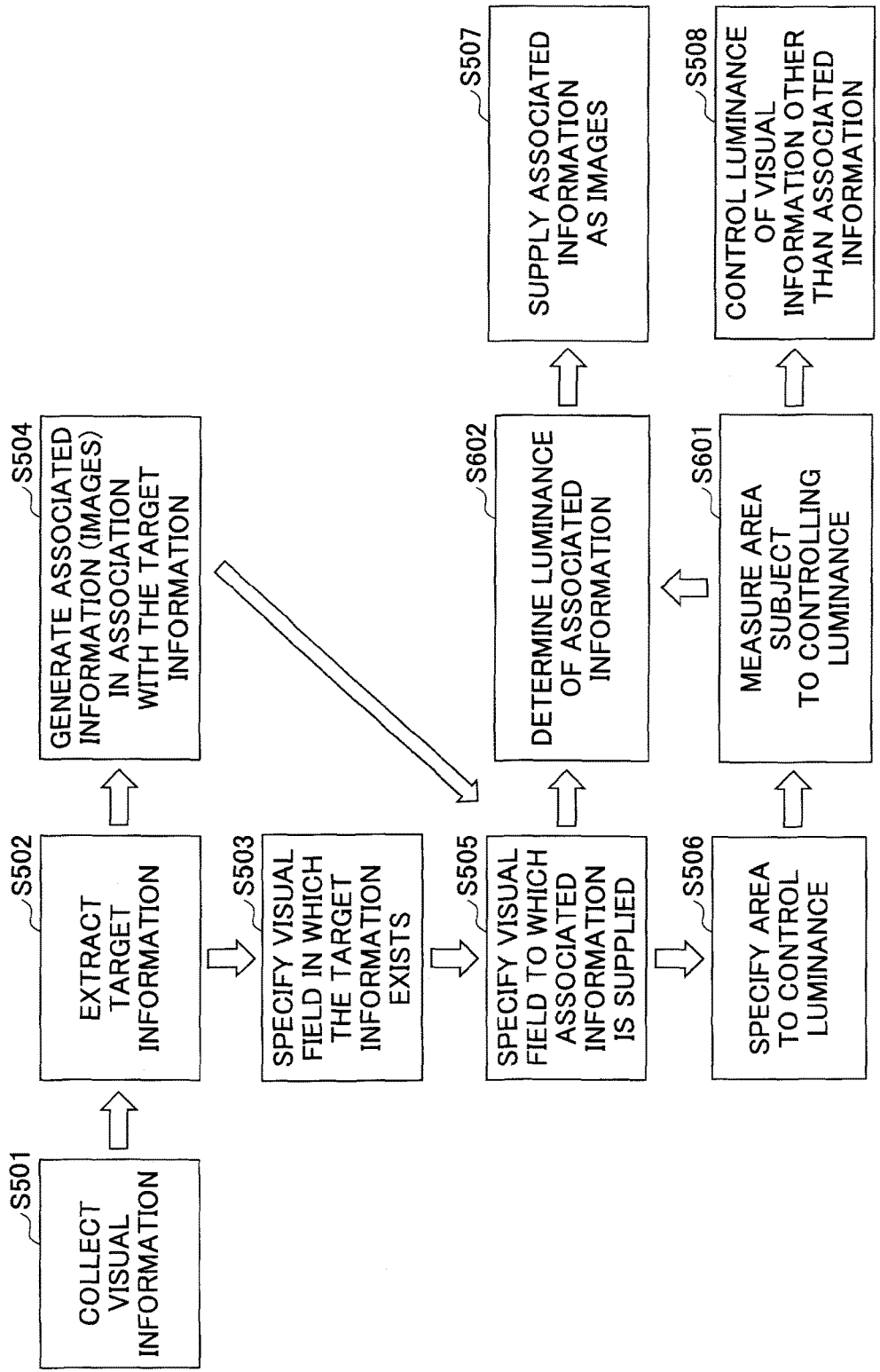

[Fig. 27]
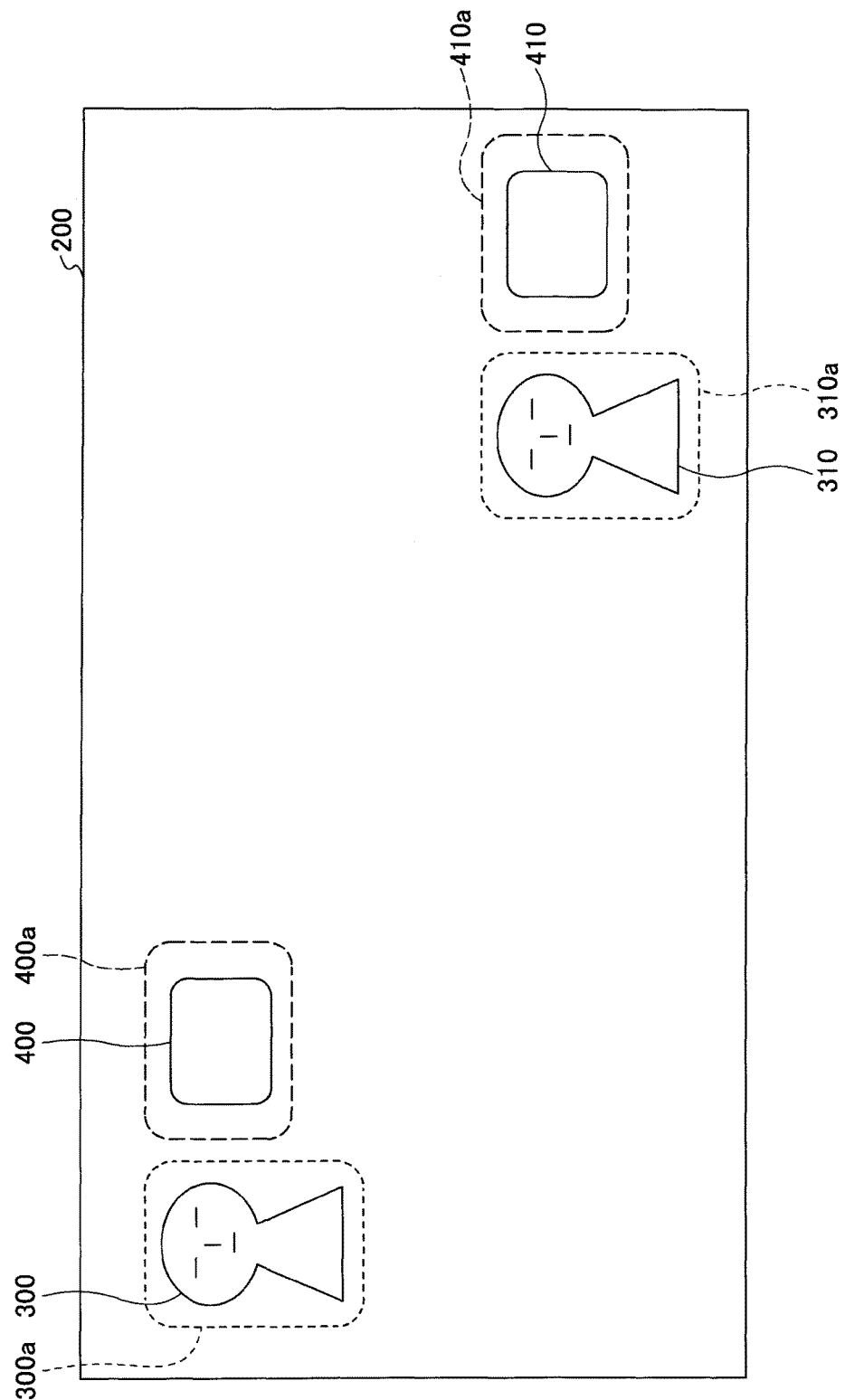

[Fig. 28]
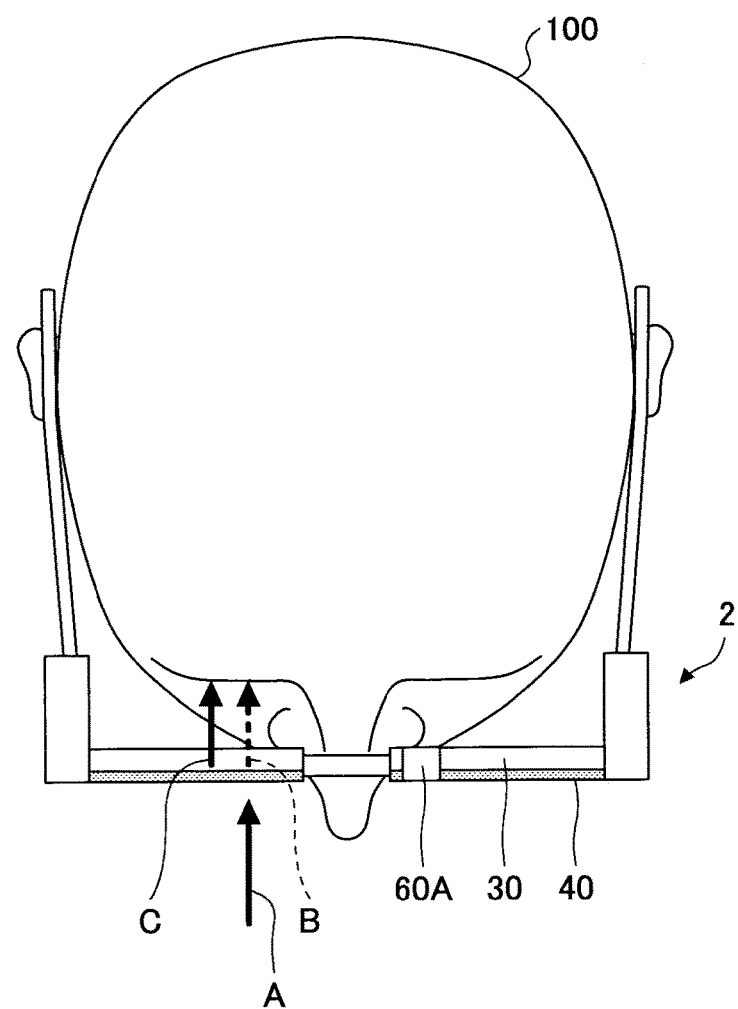

[Fig. 29]
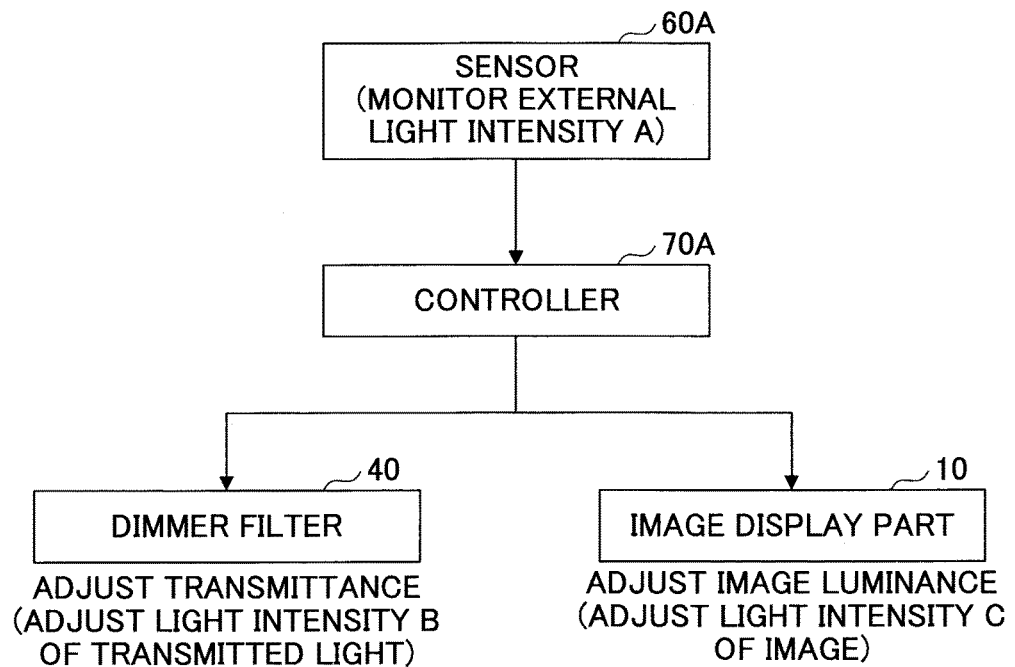
[Fig. 30]
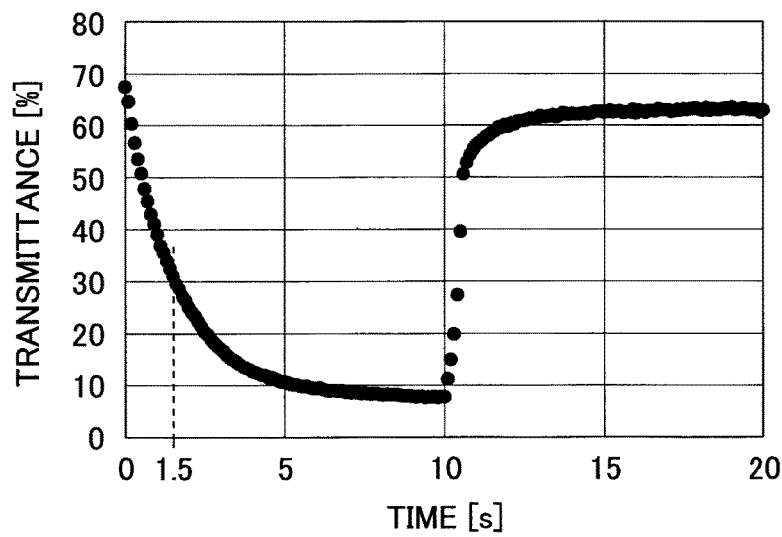

HEAD-MOUNTED DISPLAY APPARATUS, AND DISPLAY METHOD

TECHNICAL FIELD

The disclosures discussed herein relate to a head-mounted display apparatus and a method for displaying images on the head-mounted display apparatus.

BACKGROUND ART

Related art head-mounted display apparatuses (so-called "head-mounted displays (HMDs)") include display devices worn on the head of individual users. The head-mounted display apparatuses are designed to lead light from displayed images and light from the external world to the eyes of the individual wearers to provide the wearers with imagery of the images and the external world.

Such head-mounted display apparatuses may be an example of an apparatus configured to allow users to see optically superimposing surrounding scenery on images displayed on a pair of small displays via an optical system composed of a pair of reflective mirrors, a pair of eye pieces, and a polarization beam splitter. Such an apparatus includes a dimmer filter configured to change the transmittance, which is disposed in front of the polarization beam splitter (e.g., Patent Document 1).

CITATION LIST

Patent Literature

PTL 1: Japanese Patent No. 3371156

SUMMARY OF INVENTION

Technical Problem

However, when a user wears such an apparatus under brighter surroundings, the overall transmittance of a dimmer shutter may need to be reduced, which darkens the images and the overall visual field of the wearer despite the high contrast of the images being achieved. This may reduce the visibility and viewability of visual information other than the image.

Further, the above-described apparatus may secure the contrast of the images with the dimmer shutter to improve the visibility and viewability of the visual information; however, the apparatus may make the contrast of the images unnecessarily high or the luminance of the image unnecessarily high with the dimmer shutter. Consequently, the higher contrast may make it difficult for the wearer to see the background via the apparatus, or the higher luminance may increase the electric energy consumption.

Accordingly, one object in embodiments of the present invention is to provide a head-mounted display apparatus and a method for displaying images on the head-mounted display apparatus capable of improving the contrast of the images supplied and capable of preventing visibility and viewability of visual information other than the supplied images from degrading that substantially obviate one or more problems caused by the limitations and disadvantages of the related art.

In addition, another object is to provide a head-mounted display apparatus and a method for displaying images on the head-mounted display apparatus capable of reducing energy consumption without degrading visibility and viewability of visual information of the wearer that substantially obviate one or more problems caused by the limitations and disadvantages of the related art.

Solution to Problem

In accordance with an embodiment, a head-mounted display apparatus includes an image display part configured to display an image; an optical unit configured to lead the image to an eye of a wearer of the display apparatus; a light intensity detector configured to detect light intensity of external light; a dimmer filter configured to vary transmittance to adjust the intensity of the external light reaching the eye of the wearer; and a controller configured to adjust the transmittance of the dimmer filter and the light intensity of a light source of the image display part based on the light intensity of the external light obtained by the light intensity detector.

In accordance with another embodiment, a head-mounted display apparatus includes a visual information collector configured to collect visual information within a visual field range of a wearer; a visual field specifying unit configured to extract predetermined target information from the visual information, and specify a visual field in which the target information exists; an image supply unit configured to supply associated information associated with the target information as an image to the visual field of the wearer; a dimmer filter configured to change transmittance of externally introduced light; and a dimmer unit configured to control the transmittance of the dimmer filter to make luminance of visual information other than the associated information existing in the visual field to which the associated information is supplied less than an original luminance of the visual information.

BRIEF DESCRIPTION OF DRAWINGS

FIG. 1 is a perspective view of a display apparatus according to an embodiment;

FIG. 2 is a left side view illustrating an appearance of a wearer wearing the display apparatus;

FIG. 3 is a top view illustrating an appearance of a wearer wearing the display apparatus;

FIG. 4 is a diagram partially illustrating an example of a configuration of the display apparatus according to the embodiment;

FIG. 5 is a cross-sectional diagram illustrating an example of a structure of a dimmer filter;

FIG. 6 is a diagram illustrating a relationship between the light intensity A of external light, the light intensity B of transmitted light and the light intensity C of an image;

FIG. 7 is a diagram illustrating adjustment of the transmittance of the dimmer filter and the luminance of an image display part;

FIG. 8 is a graph illustrating an example of a change in the transmittance of the dimmer filter;

FIG. 9 is a diagram illustrating measurement of visibility;

FIG. 10 is a graph illustrating an example of a relationship between the image luminance and visibility when the light intensity is A1;

FIG. 11 is a graph illustrating an example of a relationship between the image luminance and visibility when the light intensity is A2 (A2<A1);

FIG. 12 is a graph illustrating an example of a relationship between the image luminance and visibility when the light intensity is A3 (A3>A1);

FIG. 13 is an example of an adjustment table stored in advance in a controller;

FIG. 14 is a graph illustrating results of an example of sensory evaluation in visibility;

FIG. 15 is a graph re-plotting the results of FIG. 14 as image visibility levels with respect to a light intensity ratio;

FIG. 16 is a graph illustrating an example of a difference between curves of image visibility levels with respect to light intensity ratios between types of images;

FIG. 17 is a graph illustrating a relationship between a drive voltage of a light source of the image display part and a detected value of a light intensity detector;

FIG. 18 is an example of an adjustment table stored in advance in a controller;

FIG. 19 is a graph illustrating an example of a relationship between the luminance of external light and an output voltage of a sensor;

FIG. 20 is a graph illustrating an example of a relationship between the transmitter of the dimmer filter and a drive voltage of the dimmer filter;

FIG. 21 is a block diagram illustrating a controller configured to perform automatic adjustment;

FIG. 22A is an example of a photograph illustrating a state when the number of gradations is unchanged;

FIG. 22B is an example of a photograph illustrating an effect obtained when the number of gradations is adjusted;

FIG. 23 is a schematic diagram illustrating a display process of target information and associated information performed by a display apparatus according to an embodiment;

FIG. 24 is a flowchart illustrating an example of an information processing flow performed by the display apparatus according to the embodiment;

FIG. 25 is a functional block diagram illustrating an example of a configuration of the display apparatus according to the embodiment;

FIG. 26 is a flowchart illustrating an example of an information processing flow performed by a display apparatus according to a first modification of the embodiment;

FIG. 27 is a schematic diagram illustrating a display process of target information and associated information performed by a display apparatus according to a second modification of the embodiment;

FIG. 28 is a diagram illustrating a relationship between the light intensity A of external light, the light intensity B of transmitted light and the light intensity C of an image;

FIG. 29 is a diagram illustrating adjustment of the transmittance of the dimmer filter and the luminance of an image display part; and FIG. 30 is a graph illustrating a change in the transmittance of the dimmer filter.

DESCRIPTION OF EMBODIMENTS

Reference will be made below in detail to embodiments, which are illustrated in the accompanying drawings. Wherever possible, the same reference numerals used throughout the drawings refer to the same or like parts.

First Embodiment

FIG. 1 is a perspective view of a display apparatus according to an embodiment. FIG. 2 is a left side view illustrating an appearance of a wearer wearing the display apparatus. FIG. 3 is a top view illustrating an appearance of the wearer wearing the display apparatus. FIG. 4 is a diagram partially illustrating an example of a configuration of the display apparatus according to an embodiment.

Referring to FIGS. 1 to 4, a display apparatus 1 according to a first embodiment is a head-mounted display apparatus that may be worn on the head of a human (a wearer 100), and mainly includes an image display part 10, an optical part 20, a light guide plate 30, a dimmer filter 40, a half mirror 50, a sensor 60, and a controller 70. The display apparatus 1 may have a shape of an eyeglass-mounted apparatus.

The display apparatus 1 is formed of two pairs of a front part 1a and a temple part 1b, which are disposed in a substantially bilateral and symmetric fashion, and the pairs each composed of the front part 1a and the temple part 1b are disposed respectively on the left and on right. The front part 1a may be formed of the light guide plate 30. The image display part 10, the optical part 20, the controller 70, and the like may be incorporated into the temple part 1b. Note that FIG. 4 illustrates an example of the left eye configuration alone of the display apparatus 1; however, the right eye configuration may be similar to the left eye configuration of the display apparatus 1.

The display apparatus 1 is configured to pass light (external images) externally introduced via the dimmer filter 40 through the half mirror 50, while superimposing the external images onto the images from the image display part 10 to allow the wearer 100 of the display apparatus 1 to view the superimposed images. The following describes components of the display apparatus 1.

The image display part 10 may be a liquid crystal display device configured to generate light including red light, green light and blue light from a light source, and scatter the light from the light source to emit the scattered light to the optical part 20. When the image display part 10 employs a liquid crystal display device, the liquid crystal display device is provided with a backlight 80 (a light source of the image display part 10) at a rear side of the image display part 10. The controller 70 may be able to control the light intensity emitted by the backlight 80 to adjust the light intensity (luminance) of the images to be displayed on the image display part 10.

The images to be displayed on the image display part 10 may be supplied from outside the display apparatus 1 through wired or wireless transmissions. Alternatively, the display apparatus 1 may be provided with a removable storage part (e.g., a memory card), and images may be supplied to the display apparatus 1 via the storage part.

The optical part 20 may include a lens 21 or a mirror 22, and is configured to lead the light emitted from the image display part 10 to the light guide plate 30. The optical part 20 may include two or more lenses or may include a prism or the like.

The light guide plate 30 is configured to reflect the light emitted from the optical part 20 off its inner surface to guide the reflected light to the half mirror 50. The light guide plate 30 is made of resin or the like having transmittance with respect to an optical wavelength of the light emitted from the optical part 20. The half mirror 50 is configured to reflect the light from the light guide plate 30, and redirect the reflected light to a rear surface of the display apparatus 1, that is, the surface facing the eye of the wearer 100 (the left eye 100L in FIG. 4). Note that the optical part 20, the light guide plate 30, and the half mirror 50 are an example of an optical unit configured to transmit the images displayed on the image display part 10 to the eye of the wearer 100.

The dimmer filter 40 is configured to adjust intensity of external light reaching the eyes of the wearer 1 by electrically changing its transmittance for the light (external light) incident on the display apparatus 1 from the outside. The dimmer filter 40 may, for example, be disposed on a front surface of the light guide plate 30 (an opposite side to the eyes of the wearer 100) to cover the visual field of the wearer 100. The dimmer filter 40 may be formed of an electrochromic element. The electrochromic element may be formed on a glass substrate that is transparent with respect to visible light, or on a plastic substrate. The use of the electrochromic element as the dimmer filter 40 enables the dimmer filter 40 to instantaneously respond to a change in the ambient brightness (luminance) to make adjustment, thereby maintaining constant visibility to and viewability by the wearer 100.

The following describes a structural example of the dimmer filter 40 by referring to FIG. 5. The dimmer filter 40 may have a cell structure made by forming a titanium oxide particle film 42 and a display layer 43 on a display substrate 41, and bonding a counterpart-substrate 45 to the resulting product via a spacer 44 of approximately 10 μm. The cell structure may, for example, enclose 1-ethyl-3-methylimidazolium tetracyanoborate as electrolyte.

An example of the display substrate 41 may be a glass substrate on which ITO is sputtered to form an electrically conductive layer; the obtained glass substrate has a thickness of approximately 60×60 mm. The titanium oxide particle film 42 may be formed, for example, by applying titanium oxide nanoparticle dispersion (SP210, product of Showa Titanium Co.) to an upper surface of the electrically conductive layer of the display substrate 41 by spin coating, and annealing the resulting product at 120° C. for approximately 15 min.

The display layer 43 may be formed as follows. For example, a compound represented by the following structural formula (Chemical formula 1), which is 1 wt % 2,2,3,3-tetrafluoropropanol solution, is applied as coating liquid to the titanium oxide particle film 42 by spin coating. The obtained product is then annealed at 120° C. for approximately 5 min to allow a titanium oxide particle surface forming the titanium oxide particle film 42 to adsorb an electrochromic compound, thereby forming the display layer 43. An example of a counterpart-substrate 45 may be a glass substrate having ITO spin coated with an oxidation color developing pigment.

Note that the dimmer filter 40 illustrated in FIG. 5 may, for example, be formed independently of other components of the display apparatus 1, and such a dimmer filter 40 may have a removable structure with respect to the front part 1*a*. The dimmer filter 40 having the above structure may be replaceable in accordance with deterioration levels of the dimmer filter 40, thereby constantly maintaining the viewability of the display apparatus 1.

Physical values for measuring the light intensity include illuminance and luminance, and the first embodiment employs an illuminance sensor or a luminance sensor as the sensor 60. A specific example of the sensor 60 may be a photodiode, or the like. The sensor 60 may be attached to the front part 1*a*, for example. The sensor 60 is a typical example of a light intensity detector according to the embodiment.

The controller 70 may be configured to adjust the transmittance of the dimmer filter 40 and the light intensity of a light source of the image display part 10, based on the light intensity of the external light obtained by the sensor 60. The controller 70 may include various functions other than those described above. The controller 70 may be configured to include a CPU (Central Processing Unit), a ROM (Read Only Memory), a RAM (Random Access Memory), a main memory, and the like.

In such a case, programs recorded in the ROM or the like may be loaded in the main memory and the loaded programs may be executed by the CPU, thereby implementing various functions of the controller 70. The CPU of the controller 70 may optionally read data from the RAM or store data in the RAM. Note that a part or all of the controller 70 may be implemented by hardware alone. Alternatively, the controller 70 may be physically composed of two or more devices.

The power supply 90 is configured to supply power to the image display part 10, the dimmer filter 40, the controller 70, or the like. The power supply 90 may be a button battery, or the like. Note that the same power supply 90 may be used for the power supply for driving the image display part 10 (including the power supply for driving the backlight 80), and the power supply for driving the dimmer filter 40 to reduce the size and weight of the display apparatus 1. Note that the power supply 90 may be configured to have an external power supply instead of incorporating the power supply 90 internally.

FIG. 6 depicts a relationship between the light intensity A of external light, the light intensity B of the transmitted light that is dimmed by the dimmer filter 40, and the light intensity C of the images transmitted from the image display part 10. The relationship indicates that making the light intensity C of the images higher than the light intensity B of the transmitted light may improve clarity or definition of the displayed images. Note that making the light intensity B of the transmitted light too low may degrade the viewability of peripheral real images.

[Chem.1]

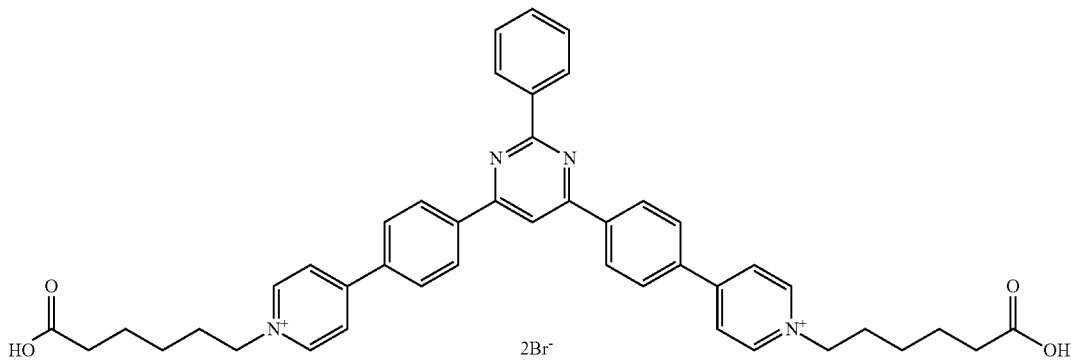

Referring back to FIGS. 1 to 4, a sensor 60 is configured to detect the light intensity of the external light (the ambient brightness or ambient luminance of the display apparatus 1).

In the display apparatus 1, the sensor 60 monitors the light intensity A of the external light and inputs the monitored result into the controller 70 as illustrated in FIG. 7. The controller 70 then automatically adjusts the transmittance of the dimmer filter 40 (which adjusts the light intensity B of the transmitted light) and the image luminance of the image display part 10 (the light intensity C of the images) based on the monitored result of the sensor 60 and the adjustment table recorded in advance in the RAM of the controller 70 at the same time.

Note that the transmittance of the dimmer filter 40 may be adjusted based on a time period in which the controller 70 applies a constant voltage to the dimmer filter 40. That is, the transmittance of the dimmer filter 40 may be adjusted based on the darkness of the color in the display layer 43. The darkness of the color in the display layer 43 is changed by controlling the amount of electric charges (electric current accumulated time) of the display layer 43 of the dimmer filter 40 in accordance with the time period in which the constant voltage is applied.

FIG. 8 is a graph illustrating an example of a change in the transmittance of the dimmer filter 40. FIG. 8 illustrates an example in which the display layer 43 of the dimmer filter 40 is caused to develop color by application of the constant voltage of 2 V. As is clear from FIG. 8, the constant voltage of 2 V may be applied for a time period of 2 s to reduce the transmittance of the dimmer filter 40 to 30%. Similarly, the constant voltage of 2 V may be applied to the dimmer filter 40 for a time period of 5 s to reduce the transmittance of the dimmer filter 40 to 10%.

Note that the transmittance of the dimmer filter 40 may vary with time. Thus, the controller 70 may preferably be provided with a transmittance detector configured to detect the transmittance of the dimmer filter 40, allowing the controller 70A to automatically correct the transmittance of the dimmer filter 40 to a desired value based on a detected result of the transmittance detector. As a result, the display apparatus 1 having the same peripheral luminance for a long period may be able to display the images without degrading the visibility. The transmittance detector may detect the transmittance at predetermined time intervals, and the controller 70 may automatically correct the transmittance at predetermined time intervals. An example of the transmittance detector may be a photodiode.

The image luminance (the light intensity C of the images) of the image display part 10 may be adjusted by causing the controller 70 to control the light intensity of light emitted by the backlight 80. The following describes an example having an LED (light emitting diode) as the backlight 80 to perform PWM (pulse width modulation) dimming. This example enables the adjustment of the luminance of the associated information by changing a pulse width (a duty ratio) for switching on or off the LED based on the instructions of the controller 70.

The following describes examples of adjusting the transmittance of the dimmer filter 40 and the image luminance of the image display part 10.

Initially, the visibility was measured under different light intensities (dimming amount) of the external light with respect to the image luminance. Specifically, a fiber probe 503 of a spectrophotometer 502 was disposed with respect to a white ring LED illumination 501 used as external light as illustrated in FIG. 9. The spectrum of an RGB image was measured by the spectrophotometer 502 by changing the luminance of white ring LED illumination 501 and the luminance of the displayed image.

Similarly, to dim the light, the spectrum of an RGB image was measured by changing the transmittance of the dimmer filter 40. The transmittance of the dimmer filter 40 was controlled by the controller 70 to electrically change the color density of the electrochromic element of the dimmer filter 40. Subsequently, xy chromaticity was obtained from each spectrum based on XYZ tri-stimulus values to compute an RGB area as an image contrast from the xy coordinates of the RGB. The visibility may generally be increased with an increase in the TGB area. Separately, a sensory evaluation was conducted in advance to determine the values at which the RGB area exhibits good and poor visibility.

FIG. 10 is a graph illustrating an example of a relationship between the image luminance and the visibility when the light intensity is A1. In FIG. 10, a curved solid line (1) indicates that the dimmer filter 40 is in a color-dissipating state (Transmitted Light Intensity B1 External Light Intensity A1). Also, a curved dash-dot line (2) indicates that the dimmer filter 40 is in a color-developing state and has transmittance of 10% (Transmitted Light Intensity B1=External Light Intensity A1×1/10). Further, a linear broken line (3) indicates that good visibility is obtained from the examined results illustrated with reference to FIG. 9.

Referring to FIG. 10, at the image luminance of C11, good visibility may be obtained when the dimmer filter 40 is in a color-dissipating state, and the light intensity A1 of the external light is scarcely adjusted (dimmed). At the image luminance of C12 less than C11, good visibility may be obtained when the transmittance of the dimmer filter 40 is adjusted to 10%.

In other words, the image luminance (the light intensity C of the image) may be reduced from C11 to C12 by adjusting the transmittance of the dimmer filter 40 while the good visibility is maintained. Hence, when the light intensity A1 of the external light is detected by the sensor 60, the transmittance of the dimmer filter 40 may be adjusted to 10%, and the image luminance (the light intensity C of the image) may be adjusted to C12. As a result of the above adjustment, good visibility may be maintained even though the image luminance (the light intensity C of the image) is reduced. This indicates that the electrical energy consumption may be reduced without degrading the visibility to the wearer.

FIG. 11 is a graph illustrating an example of a relationship between the image luminance and visibility when the light intensity is A2 (A2<A1). In FIG. 11, a curved solid line (1) indicates that the dimmer filter 40 is in a color-dissipating state (Transmitted Light Intensity B2 External Light Intensity A2). Also, a curved dash-dot line (2) indicates that the dimmer filter 40 is in a color-developing state and has transmittance of 50% (Transmitted Light Intensity B2=External Light Intensity A2×½). Further, a linear broken line (3) indicates that good visibility is obtained from the examined results illustrated with reference to FIG. 9.

Referring to FIG. 11, at the image luminance of C21, good visibility may be obtained when the dimmer filter 40 is in a color-dissipating state, and the light intensity A2 of the external light is scarcely adjusted (dimmed). At the image luminance of C21 less than C22, good visibility may be obtained when the transmittance of the dimmer filter 40 is adjusted to 50%.

With the low light intensity of the external light, a significant reduction of the transmittance of the dimmer filter 40 may degrade the visibility of real images around the wearer. Hence, when the relatively low light intensity A2 of the external light is detected by the sensor 60, the transmittance of the dimmer filter 40 may be adjusted to 50%, and the image luminance (the light intensity C of the image) may be adjusted to C22. As a result of the above adjustment, good visibility may be maintained even though the image luminance (the light intensity C of the image) is reduced. This indicates that the electrical energy consumption may be reduced without degrading the visibility to the wearer.

FIG. 12 is a graph illustrating an example of a relationship between the image luminance and visibility when the light intensity is A3 (A3>A1). In FIG. 12, a curved solid line (1) indicates that the dimmer filter 40 is in a color-dissipating state (Transmitted Light Intensity B3 External Light Intensity A3). Also, a curved dash-dot line (2) indicates that the dimmer filter 40 is in a color-developing state and has transmittance of 10% (Transmitted Light Intensity B3=External Light Intensity A3×1/10). Further, a linear broken line (3) indicates that good visibility is obtained from the examined results illustrated with reference to FIG. 9.

With the relatively high light intensity of the external light, the visibility obtained may still remain poor even though the image luminance is the highest value of C3. However, good visibility may be obtained by adjusting the transmittance of the dimmer filter 40 to 10% in this condition. Note that in this case, the image luminance remains at C3, improving the visibility, but observing no effect of reducing the energy consumption. However, the examples of FIGS. 10 and 11 may clearly provide the effect of reducing the energy consumption. Hence, the display apparatus 1 is still capable of reducing the energy consumption without degrading the visibility to the wearer.

FIG. 13 is an example of an adjustment table stored in advance in a controller. In the display apparatus 1, the sensor 60 is configured to detect the light intensity A of the external light, and the controller 70 may adjust the transmittance (the light intensity B of the transmitted light) of the dimmer filter 40 and the image luminance (the light intensity C of the image) by referring to the adjustment table of FIG. 13, based on the detected result of the sensor 60. Accordingly, the display apparatus 1 may be able to reduce the image luminance while maintaining the visibility to the wearer.

In the example of FIG. 13, when the light intensity of the external light is within a first range of relatively low light intensity (the light intensity A of the external light being less than 1000 lx), constant image luminance of the image display part 10 is maintained, and the transmittance of the dimmer filter 40 is gradually increased as the light intensity of the external light becomes higher. In addition, when the light intensity of the external light is within a second range of relatively high light intensity (the light intensity A of the external light being 1000 lx or more), constant transmittance of the dimmer filter 40 is maintained (e.g., by fixing the transmittance to the minimum value), and the light intensity of the light source of the image display part 10 is gradually increased as the light intensity of the external light becomes higher.

However, the light intensity range of the external light is not limited to the first and the second ranges described above. Alternatively, a third range may be created between the first and the second ranges. When the light intensity of the external light is within the third range, the transmittance of the dimmer filter 40 is gradually lowered and the luminance of the image display part 10 is gradually increased as the light intensity of the external light becomes higher.

Note that there may be individual differences in perceiving good visibility with respect to a relationship between the transmittance of the dimmer filter and the image luminance. Hence, it may be preferable to store multiple adjustment tables in advance in the controller to allow each of the wearers to optionally select a suitable one of the adjustment tables with a switch or the like. The above configuration enables the display apparatus 1 to display images constantly with the minimum electrical energy consumption while maintaining the visibility to the wearer even though the ambient brightness or luminance changes.

In the display apparatus 1, the transmittance of the dimmer filter 40 and the image luminance of the image display part 10 may be adjusted based on the light intensity of the external light detected by the sensor 60. This configuration enables the display apparatus 1 to display images with minimum electric energy consumption while maintaining viewability of images presented to the different wearers (without degrading the visibility of images for each of the wearers). This configuration may thus be able to increase a continuous driving time for the display apparatus 1 with the batteries.

This configuration may further be able to display images constantly with the minimum electric energy consumption without degrading the visibility to the wearers even though the ambient brightness or luminance of the display apparatus 1 changes.

This configuration may still further be able to set the image luminance to a lower value, thereby decreasing risks of causing eyestrains of the wearers due to the increased light intensity incident on the eyes.

Second Embodiment

The following second embodiment illustrates an example of simply and accurately creating an adjustment table based on predetermined formulas. Note that the second embodiment may appropriately omit illustrating the components identical to those already described in the first embodiment.

The inventors have deduced the following formulas (1) and (2). The following mainly describes methods of obtaining the formulas (1) and (2), and the technical significance of the formulas (1) and (2).

$$T = (C \times k)/(D \times A) \quad (1)$$

$$D = -\log((L\max - L0)/(L\max - L\min)) \quad (2)$$

In the above formulas (1) and (2), T denotes the transmittance of the dimmer filter 40, C denotes the light intensity of the images, A denotes the light intensity of external light incident on an incident surface of the display apparatus 1, Lmax denotes a maximum value of the viewability, Lmin denotes a minimum value of the viewability, L0 denotes a threshold of the viewability, and k denotes an image coefficient.

A visual sensory evaluation was conducted on multiple participants wearing the display apparatus 1 illustrated in FIG. 1 or the like by varying the transmittance of the dimmer filter 40 under external light of various luminance conditions. The visual sensory of each participant was evaluated on a scale of one to five levels with respect to the visibility of character images and photographic images.

FIG. 14 is a graph illustrating results of the sensory evaluation of visibility. FIG. 14 illustrates results of the character image visibility of the participants with the display apparatus 1 under the external light of 120000 lux obtained by varying the transmittance of the dimmer filter 40 to 5%, 10%, and 15%. The vertical axis of the graph indicates visibility levels of an image and the horizontal axis of the graph indicates light intensity of the image.

As illustrated in FIG. 14, the higher light intensity of the image appears to result in the higher visibility of the image, and the more blocked external light by lowering the transmittance of the dimmer filter 40 appears to result in the higher visibility of the image. The above results indicate that the visibility of the image may vary with the ratio of the light intensity B of the transmitted light and the light intensity C of the image depicted in FIG. 6.

The light intensity ratio of the light intensity C of the image (the amount of light of the image) and the light intensity B of the transmitted light (the light intensity of external light after having transmitted through the display apparatus 1) is defines as "Light intensity ratio=Light intensity C of Image/Light intensity B of Transmitted light". Note that the light intensities B and C were measured by the illuminance sensor or the luminance sensor, and values measured by the illuminance sensor or the luminance sensor were defined as the respective light intensities. In addition, the light intensity of the image was defined as the light intensity of a white solid image.

FIG. 15 is a graph re-plotting the results of FIG. 14 as the visibility levels of the image with respect to the light intensity ratio. As illustrated in FIG. 15, the visibility levels at the respective transmittances of 5%, 10%, and 15% of the dimmer filter 40 are plotted on the same curve, indicating the visibility levels being determined uniquely based on the light intensity ratio.

In addition, a similar evaluation was conducted under the external light of 1000 lux to 50000 lux. The results illustrate that the visibility levels at the respective transmittances of the dimmer filter 40 under any luminance within a range of the external light 1000 to 5000 lux are on the same curve of the visibility levels and the light intensity, indicating that the visibility levels are determined based on the light intensity ratio.

Further, as illustrated in FIG. 16, the visibility curve of the image with respect to the light intensity ratio differs between an image composed of two (black and white) gradations such as the character image and in an image composed of multiple gradations. The results indicate that the light intensity ratio needs to be increased for an image composed of intermediate gradations to improve the visibility.

The following formulas (3) and (4) were derived from the graphs of FIGS. 14 and 15 based on the results of the sensory evaluation of the visibility.

$$L = L\max - (L\max - L\min) \times \exp(-k \times \text{Light intensity ratio}) \quad (3)$$

$$\text{Light intensity ratio} = C/(A \times T) \quad (4)$$

In the above formulas (3) and (4), T denotes the transmittance of the dimmer filter 40, C denotes the light intensity of the images, A denotes the light intensity of external light incident on an incident surface of the display apparatus 1, L denotes visibility level, Lmax denotes the maximum value of the viewability level, Lmin denotes the minimum value of the viewability level, L0 denotes a threshold of the viewability level, and k denotes an image coefficient.

The threshold L of 0 in the visibility of the image may be selected as a value applied to the visibility level L to compute the required transmittance of the dimmer filter 40 for the visibility. The results obtained are the above-described formulas (1) and (2).

The light intensity C of the image in the above-described formulas (1) and (2) indicates a value detected by the light intensity detector on the surface of the light guide plate 30 opposing the eye. However, if the light intensity detector interferes with the eye, it may be undesired for the light intensity detector to be constantly placed on the surface of the light guide plate 30 opposing the eye. The light intensity detector was thus placed on the surface of the light guide plate 30 opposing the eye at the time of displaying the white solid image on the entire surface to measure the relationship between the drive voltage of the light source of the image display part 10 and the detected value of the light intensity detector. Note that the illuminance sensor may be suitable for the light intensity detector in this example; however, the luminance sensor may also be used instead.

As a result, the light intensity detector is not necessarily placed on the surface of the light guide plate 30 opposing the eye to compute the value of the light intensity C of the image of the image display part 10 based on the value of the drive voltage of the light source. Specifically, the operational circuit may use FIG. 17 as table data to compute the light intensity C of the image of the image display part 10 based on the drive voltage of the light source of the image display part 10. Note that in this case of creating the table data of FIG. 17, a sensor identical to the sensor 60 configured to detect the light intensity of the external light needs to be used.

The visibility of the image in the above-described formulas (1) and (2) may be on a scale of one to five levels or on a scale of one to ten levels. For example, the maximum value may be "5" and the minimum value may be "1" in the visibility of the image on the scale of one to five levels. The preferable threshold of the viewability of the image may be appropriately 80% of the maximum value; however, the preferable threshold on the scale of one to five levels may be "4".

The image coefficient k in the formulas (1) and (2) is determined based on the image to be displayed; the preferable image coefficient k for the character image may be in a range of 15 to 50, and the preferable image coefficient k for the photographic image may be in a range of 5 to 15.

The adjustment table for determining the transmittance of the dimmer filter 40 may be simply and accurately created by the above-described formulas (1) and (2) forming a matrix of the detected values of the light intensity detector and the drive voltage values of the light source of the image display part 10. Thus, the visibility of the images may be improved.

The visibility was unaffected even though a value with respect to the transmittance of the dimmer filter 40 computed by the formulas (1) and (2) increased or decreased within a range of ±20%. Thus, the transmittance of the dimmer filter 40 does not necessarily match the value computed by the formulas (1) and (2) in the adjustment table completely, and the transmittance computed by the formulas (1) and (2) within an error range of ±20% may be suitable for the transmittance of the dimmer filter 40.

Example 2-1

In an example 2-1, the display apparatus 1 having a configuration of FIG. 1 was created based on the following conditions.

The display apparatus main body (the front part 1a and the temple part 1b): MOVERIO BT-200 (produced by Seiko Epson Corp.)
The dimmer filter 40: Electrochromic element having properties of FIG. 8
Sensor 60: Analog ambient light sensor IC (BH1600FVC produced by ROHM Co., Ltd.)
Displayed image: white character image (20 point character)

A=a signal voltage value of the sensor 6A, Lmax=5, Lmin=1, L0=4, k=40, and C=light intensity were obtained based on the formulas (1) and (2) using a sensor identical to the sensor 60 as the light intensity detector to create the table data of FIG. 17 as the signal voltage values of the sensor 60 converted from the drive voltage values of the light source of the image display part 10. The adjustment table (FIG. 18) of the transmittance of the dimmer filter 40 created was composed of a matrix of the light intensity of the external light (voltage values of the sensor signal 60) and the light intensity of the image (drive voltage values of the light source of the image display part 10). The adjustment table (FIG. 18) was used as the adjustment table for the controller 70 illustrated in FIG. 7. The EC drive voltage in FIG. 18 is a drive voltage of the dimmer filter 40.

FIG. 19 illustrates a relationship between the output voltage value of the sensor 70A and the external light measured by a commercially available illuminometer (produced by Konica Minolta). FIG. 20 illustrates a relationship between the drive voltage the dimmer filter 40 driven by the electrochromic element and the transmittance of the dimmer filter 40. These table data illustrated in FIGS. 19 and 20 may also be used within the controller 70.

The character image was displayed in the open air of 10000 lux by the display apparatus 1 having the controller 70 illustrated in FIG. 7. The character image displayed in the open air was adjusted based on the created adjustment table of FIG. 18 to activate the dimmer filter 40 based on the light intensity of the external light, thereby making the character image clearly visible to the wearer of the display apparatus 1.

Example 2-2

The example 2-2 was configured in a manner similar to the example 2-1 except that the "k=10" was applied to the formulas (1) and (2), and a scenery image (256 gradations) was applied to the displayed image.

The adjusting table was created in a manner similar to the example 2-1. The scenery image was displayed by the display apparatus 1 having the controller 70 illustrated in FIG. 7. The scenery image was controlled based on the created adjustment table, and displayed under the open air of 10000 lux. This had activated the dimmer filter 40 based on the light intensity of the external light, making the scenery image clearly visible to the wearer of the display apparatus 1.

Third Embodiment

A third embodiment illustrates an example in which the operational circuit creates the adjustment table in accordance with a signal from the sensor 60, based on the formulas (1) and (2). Subsequently, the transmittance of the dimmer filter 40 and the light intensity of the image are automatically adjusted based on the created adjustment table to make the visibility (viewability) of the image greater than or equal to the threshold. Note that the third embodiment may appropriately omit illustrating the components identical to those already described in the above embodiments.

FIG. 21 is a block diagram illustrating an example of the controller 70 configured to perform automatic adjustment. The controller has a circuit configuration example to control, based on the formulas (1) and (2), the detected value of the light intensity of the sensor 60, the voltage for determining light intensity of the light source of the image display part based on the detected value, and the voltage for determining the transmittance of the dimmer filter 40.

The controller 70 includes a sensor voltage detector circuit 75, an image recognition processor circuit 76, a light source voltage controller circuit 77, a dimmer filter voltage controller circuit 78, and an operational circuit 79. The sensor voltage detector circuit 75 is configured to detect a signal voltage value corresponding to the light intensity of the sensor 60 of the display apparatus 1 and output a detected result to the operational circuit 79.

The image recognition processor circuit 76 is configured to recognize types of the images (e.g., the character image, the photographic image, and video) based on the image data, and output the recognized type of the image to the operational circuit 79. The light source voltage controller circuit 77 is configured to control the drive voltage of the light source of the image display part 10 based on the instructions from the operational circuit 79. The dimmer filter voltage controller circuit 78 is configured to change the drive voltage of the dimmer filter 40 based on the instructions from the operational circuit 79 to control the transmittance of the dimmer filter 40.

The operational circuit 79 is configured to perform computational operations based on the formulas (1) and (2) in accordance with the signals input from the sensor voltage detector circuit 75 and the image recognition processor circuit 76, and compute the optimal drive voltage of the light source of the image display part 10 and the drive voltage of the dimmer filter 40 to create an adjustment table as required. The operational circuit 79 is configured to subsequently transmit the instructions to the light source voltage controller circuit 77, and the dimmer filter voltage controller circuit 78, based on the created adjustment table. The light source voltage controller circuit 77 is configured to automatically adjust the light intensity of the light source of the image display part 10 in multiple stages, and the dimmer filter voltage controller circuit 78 is configured to automatically adjust the transmittance of the dimmer filter 40 in multiple stages.

The configuration of the eighth embodiment may acquire the light intensity A of the external light from the sensor 60, create the adjustment table based on the formulas (1) and (2) as required, and automatically adjust the transmittance of the dimmer filter 40 and the light intensity of the image based on the created adjustment table. This configuration does not require a large number of adjustment tables in accordance of different light intensities of the external light to reduce the storage capacity of the controller 70 as well as reducing the size of the process circuit. In addition, this configuration may significantly increase the process speeds for automatically adjusting the transmittance the dimmer filter 40 and the light intensity of the image of the image display part 10.

Example 3-1

The example 3-1 was configured in a manner similar to the example 2-1 except that the display apparatus 1 employed the controller 70 of FIG. 21. Specifically, the operational circuit 79 computed the drive voltage of the dimmer filter 40 and the drive voltage of the light source of the image display part 10 to obtain the visibility that was most suitably adapted to the external light, based on the signal value input from the sensor 60 and the signal value input from the image recognition processor circuit 76. The operational circuit 79 subsequently adjusted the transmittance of the dimmer filter 40 and the luminance of the image to the optimal ones of the transmittance and the luminance. Note that the computation performed by the operational circuit 79 was programmed to refer to data of the table of FIG. 19 and data of the table of FIG. 20.

The character image was displayed inside the room of 1000 lux, under a tree of 10000 lux, and under the blazing sun of 40000 lux, based on the light intensity of the external light. The results illustrate that the transmittance of the dimmer filter 40 and the luminance of the image were automatically adjusted based on the light intensity of the external light, and the character image displayed was clearly visible under the above three conditions.

Example 3-2

The example 3-2 was configured to in a manner similar to the example 3-1 except that the "k=10" was applied to the formulas (1) and (2), and a scenery image (256 gradations) was applied to the displayed image.

The scenery image was displayed inside the room of 1000 lux, under a tree of 10000 lux, and under the blazing sun of 40000 lux, based on the light intensity of the external light. The results illustrate that the transmittance of the dimmer filter 40 and the luminance of the image were automatically adjusted based on the light intensity of the external light, and the scenery image displayed was clearly visible under the above three conditions.

Fourth Embodiment

A fourth embodiment illustrates an example in which the dimmer filter starts being controlled before the image is displayed on the image display part. Note that the fourth embodiment may appropriately omit illustrating the components identical to those already described in the above embodiments.

The human eye has the ability to become adjusted to various levels of darkness and light, namely, dark adaptation and light adaptation. The dark adaptation indicates that the sensitivity of the eye in a light environment quickly adapts to a dark environment when the light environment changes to the dark environment. The dark adaptation results from the pupillary light reflex (PLR) or photopupillary reflex and light sensitivity of the retina, and it takes a predetermined time period for the eye to adapt to darkness from bright environment. Thus, when a wearer (participant) moves from a bright place to a dark place, the wearer may fail to recognize the surrounding scene in the dark place.

When the wearer constantly wears the display apparatus 1 in the open-air clear weather, the dimmer filter 40 constantly activates to dim highly intensive light entering into the eye, providing the wearer with good visibility of the image. However, when the participant who occasionally wears the display apparatus 1 stays in the open-air clear weather for a long time, the eye needs to have some time to adapt to the darkness. As a result, the participant may fail to clearly recognize the image for a while after the dimmer filter 40 has activated.

Thus, the display apparatus 1 may be tailored to the participant who occasionally wears the display apparatus 1 under the bright environment as follows. That is, the display apparatus 1 is configured to encourage the participant to switch the power of the display apparatus 1 on when the participant uses the display apparatus 1 to only activate the dimmer filter 40 without displaying the image within a time period while the sensitivity of the eye becomes adapted to the darkness. The display apparatus 1 is configured to subsequently display an image after the eye has adapted to the darkness. In this embodiment, such functions may be combined into the controller 70 of the display apparatus 1.

The suitable time for only controlling the dimmer filter 40 without displaying the image at the time where the participant has worn the display apparatus 1 may be approximately one minute. The preferable transmittance of the dimmer filter 40 at this time may be the value closest to the minimum, that is, in a range of 2 to 5%. After the time for only controlling the dimmer filter 40 without displaying the image has elapsed, the transmittance of the dimmer filter 40 and the light intensity of the light source of the image display part 10 based on the light intensity of the external light to allow the participant (wearer) to see the image clearly.

In the fourth embodiment, the dimmer filter 40 initially functions to block the external light incident on the eye to display the image at a timing at which the eye becomes adapted to the dark place, which meets the dark adaptation of the human eye, and improves the visibility under the extremely bright environments such as sunny summer conditions.

Example 4-1

An example 4-1 was configured in a manner similar to the example 3-1 except that the display apparatus 1 was programmed to activate the dimmer filter 40 to automatically become activated for one minute with the transmittance of 5% when a participant had worn the display apparatus 1 and turned a main switch of the display apparatus 1 on.

When a participant (wearer) wore the display apparatus 1 and turned a main switch of the display apparatus 1 on, the dimmer filter 40 was immediately activated and served as slightly darker sunglasses to block the external incident light for one minute. After one minute, the photographic image was displayed by adjusting the transmittance of the dimmer filter 40 and the light intensity of the light source of the image display part 10 based on the light intensity of the external light, allowing the participant to see the image clearly.

Note that by comparison, the participant wore the display apparatus 1 in the open-air clear weather with the external light of 5000 lux, except that the display apparatus 1 was programmed not to immediately activate the dimmer filter 40 when the participant had turned on the main switch. In this case, after the participant turned on the switch and a certain time had elapsed, the photographic image was displayed by adjusting the transmittance of the dimmer filter 40 and the light intensity of the light source of the image display part 10 based on the light intensity of the external light. The results illustrate that the photographic image was not clearly visible to the participant for 10 minutes.

Fifth Embodiment

A fifth embodiment illustrates an example in which the gradations of the image displayed on the image display part is changed based on the light intensity of the external light and the transmittance of the dimmer filter 40. Note that the fifth embodiment may appropriately omit illustrating the components identical to those already described in the above-described embodiments.

Under the bright environment such as the open-air clear weather, the transmittance of the dimmer filter 40 may need to be significantly reduced in order for each participant wearing the display apparatus 1 to clearly see (obtain good visibility of) the displayed image. For example, the visibility experiments had demonstrated that the human eye fails to visually recognize typical photographic images under the environment of 60000 lux unless the transmittance of the dimmer filter 40 is approximately 2%.

Conversely, with the dimmer filter 40 having the transmittance of 2%, the participants will see the image but may have difficulty in seeing the ambient environment, which may cause the participants to have a problem with carrying out tasks while walking or viewing the image. On the other hand, the visibility experiments conducted in the past had demonstrated that when the character image was displayed under the environment of 60000 lux, the participants were able to see or recognize the characters with the dimmer filter 40 having the transmittance of 10%. With the transmittance of 10%, the participants will not have a problem with walking or carrying out tasks.

One of the main differences between the character image and the photographic image is the number of gradations; the character image has two gradations (binary) and the photographic image has 256 gradations. A large number of gradations lowers the contrast of the image, resulting in low visibility. To improve the visibility, the controller 70 of the display apparatus 1 in this embodiment further includes an image correcting unit configured to correct a gamma value of the image displayed on the image display part 10 based on the light intensity A of the external light and the transmittance of the dimmer filter 40.

When the purpose of looking at photographs or graphic images with the display apparatus 1 is to be navigated by a map while walking or checking the task instructions, the reproducibility of the image is not of importance; users may need only to verify the point spots on the route to the destination or the main point of the task instructions. The results illustrate that the participants were able to recognize the point spots on the route to the destination or the main points of the task instructions under the outdoor clear weather of 60000 lux by making the contrast of the photographs or graphics extremely high and then lowering, for example, the 256 gradations from 3 to 5 gradations.

The image recognition processor circuit 76 of FIG. 21 is provided with a function to change the number of gradations of the image based on the light intensity A of the external light and the transmittance of the dimmer filter 40. For example, the image recognition processor circuit 76 may lower 256 gradations to 10 gradations when the external light has the light intensity of 10000 lux, the dimmer filter 40 has the transmittance of 10%, and the original image has 256 gradations. Alternatively, the image recognition processor circuit 76 may lower 256 gradations to 4 gradations when the external light has the light intensity of 60000 lux, the dimmer filter 40 has the transmittance of 5%, and the original image has 256 gradations. The light intensity A of the external light, the transmittance of the dimmer filter 40, and the number of gradations to be reduced may be stored as a table.

This configuration may improve the visibility of a halftone image under the extremely bright external light with the dimmer filter 40 having the transmittance range (5% or more) of allowing the users to see the ambient environment, thereby providing the users with the visibility of both the ambient environment and the displayed image.

Example 5-1

An example 5-1 was configured in a manner similar to the example 3-1 except that the display apparatus 2 was programmed to change the number of gradations of the image to be displayed based on the luminance of the external light.

The photograph illustrated in FIG. 22A was determined to be acceptable when the participant wearing the display apparatus 1 was able to recognize a part of the original photograph (256 gradations) enclosed by a broken line circle $D_1$ under an environment of predetermined luminance.

The photograph illustrated in FIG. 22A was obtained by the image recognition processor circuit 76 that had reduced the gradation of the original photograph to 40 gradations based on the signals from the sensor 60 under the external light of 50000 lux. The participant wore the display apparatus 1 in the open-air clear weather with the external light of 5000 lux, and the image was displayed. The displayed image was the photographic image illustrated in FIG. 22B, which had been obtained by adjusting the transmittance of the dimmer filter 40 and the light intensity of the light source of the image display part 10 based on the light intensity of the external light, and the participant was able to clearly recognize and see a part of the displayed image enclosed by a broken line circle $D_2$.

Further, by comparison, the photographic image illustrated in FIG. 22A was displayed in the open-air clear weather having the external light of 50000 lux. The results illustrate that the participant failed to recognize what was presented in the part of the displayed image enclosed by the broken line circle $D_1$.

Sixth Embodiment

The following describes a sixth embodiment with reference to FIGS. 1 to 5 because the sixth embodiment has an appearance and arrangement partially similar to those of the first embodiment. FIG. 1 is a perspective diagram illustrating an example of an external view of a display apparatus according to the sixth embodiment. FIG. 2 is a left side view illustrating an appearance of a wearer wearing the display apparatus. FIG. 3 is a top view illustrating an appearance of a wearer wearing the display apparatus. FIG. 4 is a diagram partially illustrating an example of a configuration of the display apparatus according to the sixth embodiment.

Referring to FIGS. 1 to 4, a display apparatus 1 according to the sixth embodiment is a head-mounted display apparatus that may be worn on the head of a human (a wearer 100), and mainly includes an image display part 10, an optical part 20, a light guide plate 30, a dimmer filter 40, a half mirror 50, a sensor 60, and a controller 70. The display apparatus 1 may have a shape of an eyeglass-mounted apparatus.

The display apparatus 1 is formed of two pairs of a front part 1a and a temple part 1b, which are disposed in a substantially bilateral and symmetric fashion, and the pairs each composed of the front part 1a and the temple part 1b are disposed respectively on the left and on the right. The front part 1a may be formed of the light guide plate 30. The image display part 10, the optical part 20, the controller 70, and the like may be incorporated into the temple part 1b. Note that FIG. 4 illustrates an example of the left eye configuration alone of the display apparatus 1; however, the right eye configuration may be similar to the left eye configuration of the display apparatus 1.

The display apparatus 1 is configured to pass light (external images) externally introduced via the dimmer filter 40 through the half mirror 50 while superimposing the external images onto the images from the image display part 10 to allow the wearer 100 of the display apparatus 1 to view the superimposed images. The following describes components of the display apparatus 1.

The image display part 10 may be a liquid crystal display device configured to generate light including red light, green light and blue light from a light source, and scatter the light from the light source to emit the scattered light to the optical part 20. When the image display part 10 employs a liquid crystal display device, the liquid crystal display device is provided with a backlight 80 (a light source of the image display part 10) at a rear side of the image display part 10. The controller 70 may be able to control the light intensity emitted by the backlight 80 to adjust the light intensity (luminance) of the images to be displayed on the image display part 10.

The images to be displayed on the image display part 10 may be supplied from outside the display apparatus 1 through wired or wireless transmissions. Alternatively, the display apparatus 1 may be provided with a removable storage part (e.g., a memory card), and images may be supplied to the display apparatus 1 via the storage part.

The optical part 20 may include a lens 21 or a mirror 22, and is configured to lead the light emitted from the image display part 10 to the light guide plate 30. The optical part 20 may include two or more lenses or may include a prism or the like.

The light guide plate 30 is configured to reflect the light emitted from the optical part 20 off its inner surface to guide the reflected light to the half mirror 50. The light guide plate 30 is made of resin or the like having transmittance with respect to an optical wavelength of the light emitted from the optical part 20. The half mirror 50 is configured to reflect the light from the light guide plate 30, and redirect the reflected light to a rear surface of the display apparatus 1, that is, the surface facing the eye of the wearer 100 (the left eye 100L in FIG. 4).

The dimmer filter 40 is configured to change the transmittance of light introduced from outside into the display apparatus 1. The dimmer filter 40 may be disposed at a front surface of the light guide plate 30 (the opposite side of the eye of the wearer 100) to cover a field of view of the wearer 100. The dimmer filter 40 may be formed of an electrochromic element. The electrochromic element may be formed on a glass substrate that is transparent with respect to visible light, or on a plastic substrate. Use of the electrochromic element as the dimmer filter 40 may enable the transmittance of the dimmer filter 40 to be electrically controllable and increase the higher transmittance range of the dimmer filter 40 compared to use of liquid crystal and a polarizer as the dimming filer 40, thereby preventing the later-described associated information from being invisible.

The display substrate 41 may be formed of a film substrate having an ITO conductive film of approximately 150×80 mm. The titanium oxide particle film 42 may be formed, for example, by applying titanium oxide nanoparticle dispersion to the display substrate 41 by spin coating, and annealing the resulting product at 120° C. for approximately 15 min.

The display layer 43 may be formed as follows. For example, a compound represented by the following structural formula (Chemical formula 1), which is 1 wt % 2,2,3,3-tetrafluoropropanol solution, is applied as coating liquid to the titanium oxide particle film 42 by spin coating. The obtained product is then annealed at 120° C. for approximately 10 min to allow a titanium oxide particle surface forming the titanium oxide particle film 42 to adsorb an electrochromic compound, thereby forming the display layer 43.

The dimmer filter 40 is configured to include the transmittance, positions or sizes of the configurations inside the dimmer filter 40 that may be changeable by the controller 70. Such a configuration of the dimmer filter 40 may be implemented by employing a thin film transistor array having higher transmittance as the counterpart substrate 45. For example, the visual field of the wearer 100 may be divided into multiple pixels, and a transistor array having thin film transistors for respective pixels may be used as the counterpart substrate 45. The power supplied to the display layer 43 of the dimmer filter 40 may be controlled by individual control of the thin film transistors, making the transmittance of the display layer 43 controllable based on an optional positions or sizes of the components of the dimmer filer 40.

Alternatively, the counterpart substrate 45 may be divided into several regions (segments) corresponding to the visual field of the wearer 100, and the segments may be provided with individual wires. The transmittance of the display layer 43 may thus be changed on the segment-to-segment basis by controlling the power supplied to each of the individual wires. Such technique may be preferable because an expensive component such as a thin transistor array is not used.

[Chem.2]

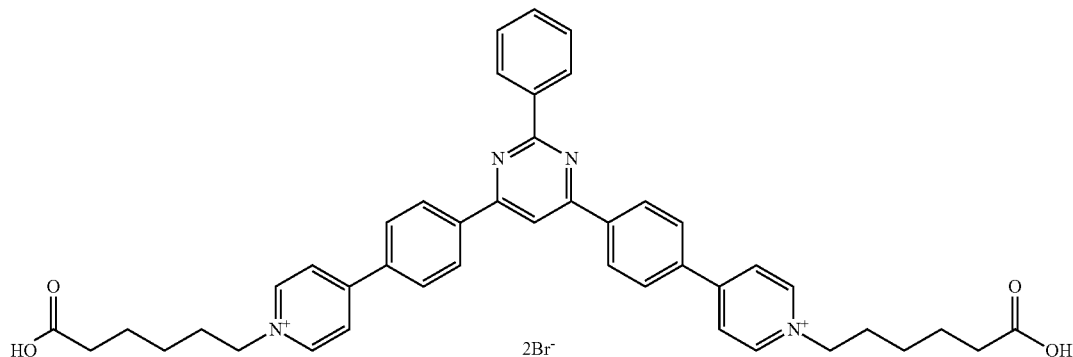

The following describes a structural example of the dimmer filter 40 by referring to FIG. 5. The dimmer filter 40 may have a cell structure made by forming a titanium oxide particle film 42 and a display layer 43 on a display substrate 41, and bonding a counterpart-substrate 45 to the resulting product via a spacer 44 of approximately 10 μm. The cell structure may, for example, enclose 1-ethyl-3-methylimidazolium tetracyanoborate as electrolyte.

Referring back to FIGS. 1 to 4, a sensor 60 is configured to collect visual information within the visual field range of the wearer 100 of the display apparatus 1. An example of the sensor 60 may include a compact CMOS (Complementary Metal Oxide Semiconductor) camera incorporated into notebook PCs (personal computers) or a smartphones. Alternatively, a CCD (Charge Coupled Device) camera may also be used as the sensor 60. The sensor 60 may be attached to the front part 1*a*, for example. The sensor 60 is a typical example of a visual information collector according to the embodiments.

The controller 70 may be configured to process the visual information of the wearer 100 and adjust the transmittance of the dimmer filter 40. The controller 70 may include various functions other than those described above. The controller 70 may be configured to include a CPU (Central Processing Unit), a ROM (Read Only Memory), a RAM (Random Access Memory), a main memory, and the like.

In such a case, programs recorded in the ROM or the like may be loaded in the main memory and the loaded programs may be executed by the CPU, thereby implementing various functions of the controller 70. The CPU of the controller 70 may optionally read data from the RAM or store data in the RAM. Note that a part or all of the controller 70 may be implemented by hardware alone. Alternatively, the controller 70 may be physically composed of two or more devices.

The power supply 90 is configured to supply power to the image display part 10, the dimmer filter 40, the controller 70, or the like. The power supply 90 may be a button battery, or the like. Note that the same power supply 90 may be used for the power supply for driving the image display part 10 (including the power supply for driving the backlight 80), and the power supply for driving the dimmer filter 40 to reduce the size and weight of the display apparatus 1. Note that the power supply 90 may be configured to have an external power supply instead of incorporating the power supply 90 internally.

Next, the following describes target information and associated information in the display apparatus 1 with reference to FIG. 23. The target information refers to information that is set in advance in the display apparatus 1 (e.g., information registered in the RAM of the controller 70), and that is subject to receiving associated information. The associated information refers to information associated with the target information. For example, when the associated information is supplied as images to the display apparatus 1, the target information may be regarded as, among the visual information present in the visual field of the wearer 100, information capable of improving the quality of actions of the wearer 100 or contributing to reducing the time required for the wearer 100 to take the actions.

For example, when the wearer 100 works in retail, and the display apparatus 1 capable of recognizing the customers faces is able to present images of the past visiting records of the customers or the preferences of the customers, the wearer 100 may be able efficiently serve the customers. In such a case, a "person's face" may preferably be set as the target information. As illustrated in FIG. 23, when the "person's face" exists in the visual field 200 of the wearer 100, the display apparatus 1 recognizes the "person's face" as the target information 300 or 301. The display apparatus 1 may then display "the past visiting records or preferences of this customer" as images.

Alternatively, when a "product's barcode" is registered in advance as the target information, and the "product's barcode" exists in the visual field 200 of the wearer 100, the display apparatus 1 recognizes the "product's barcode" as the target information. The display apparatus 1 may then display "arrival date and time, scheduled shipping date and time, scheduled shipping destination, etc." as the associated information.

The barcode is generally read by a scanner, and the read information is displayed on a display. However, the display apparatus 1 of the embodiments may be able to instantaneously recognize the information associated with the barcode immediately after the barcode enters the visual field of the wearer 100. The inventory stocktaking may be efficiently improved.

Note that FIG. 23 illustrates an example in which the target information 300 and the associated information 400 that are present in an upper left area of the visual field 200 of the wearer 100, and the target information 310 and the associated information 410 are present in a lower right area of the visual field 200 of the wearer 100. However, the embodiment is not limited to this example. Alternatively, the wearer 100 may set the target information by himself or herself, or a manager of the display apparatus 1 (e.g., a representative who unifies retailers) may set the target information.

Next, the following example describes an information processing method performed by the display apparatus 1 when the target information is a "person's face" with reference to FIGS. 23 to 25. Note that FIG. 24 is a flow diagram illustrating an example of an information process flow, and FIG. 25 is a block diagram illustrating functions of the controller 70.

Initially, in step S501, the sensor 60 of the display apparatus 1 collects visual information within a visual field range of the wearer 100 of the display apparatus 1, and transmits the collected visual information to the controller 70. The sensor 60 may, for example, collect the visual information within the visual field 200 of FIG. 23, and transmit the collected visual information to the controller 70.

In step S502, a visual field specifying unit 71 of the controller 70 subsequently extracts preset target information from the visual information collected by the sensor 60. In step S503, the visual field specifying unit 71 of the controller 70 subsequently specifies a visual field in which the target information exists.

For example, the visual field specifying unit 71 extracts the target information 300 of FIG. 23 from the visual information collected by the sensor 60, and specifies the visual field 300*a* in which the target information 300 exists. Alternatively, the visual field specifying unit 71 extracts the target information 310 of FIG. 23, and specifies the visual field 300*a* in which the target information 310 exists. When the target information is a "person's face", the visual field specifying unit 71 may, for example, use face recognition software recorded in the ROM or the like of the controller 70 to extract the target information. Alternatively, the visual field 200 of the wearer 10 may be divided into multiple pixels in advance, and the visual field specifying unit 71 may record an address of each of the pixels in advance to specify the visual field.

Note that specifying the visual field in which the target information exists indicates causing the sensor 60 to specify the location information in which the target information exists within the captured image. Specifically, when the target information is a "person's face", the sensor 60 may specify a rectangular area adjacent to the outline of a person's face as the visual field in which the target information exists. Alternatively, when the target information is a "barcode" or a "QR code (registered trademark)", the sensor 60 may specify a rectangular area or a square area adjacent to the code as the visual field in which the target information exists. The visual field in which the target information exists may serve as the basis of the location information within the visual field to which the associated information is supplied.

In step S504, an associated information generator unit 72 of the controller 70 detects associated information in association with the extracted target information, and generates appropriate information for supplying the generated information to the wearer 100 as images. For example, when the target information is a "person's face", the associated information generator unit 72 detects feature points of the extracted person's face, and matches the detected feature points with the target information and face information accumulated in advance in a database to specify a person, and subsequently, generates appropriate information (visiting history, or preferences) for supplying the generated information as images to the specified person.

The feature points of the person's face may be detected using face recognition software recorded in the ROM of the controller 70. Note the appropriate information indicates information that may be capable of improving the quality of the wearer's actions or contributing to reducing the time required for the wearer's actions. Note that step S503 may be processed in parallel with processing of step S504.

In step S505, an image supply unit 73 of the controller 70 specifies a visual field to which the associated information is supplied as images, at a position at which the visual field has an appropriate positional relationship with the visual field in which the target information exists. Note that the appropriate positional relationship indicates a positional relationship that makes a wearer intuitively understand the supplied associated information being associated with the target information. Specifically, the "visual field to which the associated information is supplied" is defined as an area having an appropriate size and shape in terms of visibility and viewability, the area being adjacent to the visual field in which the target information exists, and on which the visual field is superimposed.

Note that FIG. 23 depicts an example in which the image supply unit 73 specifies a visual field 400a to which the associated information is supplied to be partially superimposed on the visual field 300a in which the target information 300 exists. Similarly, FIG. 23 also depicts an example in which the image supply unit 73 specifies a visual field 410a to which the associated information 410 is supplied to be partially superimposed on the visual field 310a in which the target information 300 exists.

Next, in step S506, the image supply unit 73 of the controller 70 specifies an area in which the luminance or brightness of the visual information other than the associated information is controlled (i.e., the visual field that causes the wearer 100 to recognize the darkness of the visual information) to be partially or fully superimposed on the visual field to which the associated information is supplied. The area in which luminance is controlled is determined for the purpose of improving the contrast of the associated information supplied. Hence, the area may preferably be partially or fully superimposed on the visual field to which the associated information is supplied. For example, the area in which the luminance is controlled may be matched with the visual field to which the associated information is supplied.

Note that FIG. 23 depicts an example of the visual field 400a to which the associated information is supplied matching the area in which the luminance is controlled, and also an example the visual field 410a to which the associated information 410 is supplied matching the area in which the luminance is controlled. That is, an example of FIG. 23 indicates the visual field 400a to which the associated information is supplied=the area in which the luminance is controlled, and also indicates the visual field 410a to which the associated information 410 is supplied=the area in which the luminance is controlled.

Subsequently, in step S507, the image supply unit 73 of the controller 70 supplies the associated information as images within the visual field range of the wearer 100. In step S508, the dimmer unit 74 of the controller 70 controls the transmittance of the dimmer filter 40 to make visual information other than the associated information in the area in which the luminance is controlled (i.e., the visual field to which the associated information is supplied) darker compared to the original luminance of the visual information. The processes of step S507 and step S508 may be executed at approximately the same time.

For example, the image supply unit 73 may supply the associated information 400 to the visual field 400a of FIG. 23. The dimmer unit 74 subsequently makes the visual information other than the associated information 400 in the area in which the luminance is controlled (i.e., the visual field 400a) of FIG. 23 darker than the original luminance of the visual information. Note that only a part of the visual information other than the associated information 400 present in the area in which the luminance is controlled may be made darker than the original luminance of the visual information insofar as the visibility of the associated information is retained.

Alternatively, the image supply unit 73 may supply the associated information 410 to the visual field 410a of FIG. 23. The dimmer unit 74 subsequently makes the visual information other than the associated information 410 in the area in which the luminance is controlled (i.e., the visual field 410a) of FIG. 23 darker than the original luminance of the visual information. Note that a part of the visual information other than the associated information 410 present in the area in which the luminance is controlled may be made darker than the original luminance of the visual information insofar as the visibility of the associated information is retained.

Note that the transmittance of the dimmer filter 40 may be adjusted based on a time period in which the dimmer unit 74 of the controller 70 applies a constant voltage to the dimmer filter 40. That is, the transmittance of the dimmer filter 40 may be adjusted based on the darkness of the color in the display layer 43. The darkness of the color in the display layer 43 is changed by controlling the amount of electric charges (electric current accumulated time) of the display layer 43 of the dimmer filter 40 in accordance with the time period in which the constant voltage is applied. For example, the transmittance of the dimer filter 40 may be 30% by applying the constant voltage of 2 V from the dimmer unit 74 of the controller 70 to the dimmer filter 40 for a time period of 1.5 s, whereas the transmittance of the dimer filter 40 may be 10% by applying the constant voltage of 2 V from the dimmer unit 74 of the controller 70 to the dimmer filter 40 for a time period of 5 s. It is obviously understood that the relationship between the constant voltage applied, the time period in which the constant voltage is applied, and the transmittance of the dimmer filter 40 vary with the different specifications.

Note that the transmittance of the dimmer filter 40 may vary with time. Thus, the controller 70 may preferably be provided with a transmittance detector configured to detect the transmittance of the dimmer filter 40, allowing the dimmer unit 74 of the controller 70 to automatically correct the transmittance of the dimmer filter 40 to a desired value based on a detected result of the transmittance detector. As a result, the display apparatus 1 having the same peripheral luminance for a long period may be able to display the images without degrading the visibility. The transmittance detector may detect the transmittance at predetermined time intervals, and the controller 70 may automatically correct the transmittance at predetermined time intervals. An example of the transmittance detector may be a photodiode.

As described above, the contrast of the associated information supplied as the images in the display apparatus 1, which has the background of the associated information lighter than the original, may be improved (increased) by controlling the luminance of the visual information other than the associated information. Note that the luminance is controlled only for a peripheral part of the associated information, and is not controlled for darkening the entire visual field of the wearer 100. This may prevent the visibility of the visual information other than the associated information to be supplied as the images from degrading as well as maintaining good visibility of the entire visual field of the wearer 100.

Further, controlling the luminance of the peripheral part of the associated information may make the wearer of the display apparatus 1 intuitively perceive the associated information being associated with the target information by superimposing a part of or all of the visual field of the target information and the visual field to which the associated information is supplied.

In addition, the position, the area, and the luminance of the visual field of the dimmer filter in which the wearer is caused to perceive the darkness of the visual information may be electrically controlled by the dimmer unit. This configuration may make both the target information and the associated information visible regardless of the position and the size of the target information in the visual field, and regardless of the luminance of the background being high at a position at which the associated information is supplied.

Note that the associated information may be moved to follow the target information, or the associated information may stop being supplied without being moved after a certain time when the target information is moved within the visual field of the wearer.

First Modification of Sixth Embodiment

The following first modification of the sixth embodiment illustrates another example of information processing method performed by the display apparatus 1. Note that the first modification of the sixth embodiment may appropriately omit illustrating the components identical to those already described in the sixth embodiment.

Another example describes the information processing method performed by the display apparatus 1 when the target information is a "person's face" with reference to FIGS. 23 to 26. Note that FIG. 26 is a flowchart illustrating an information processing procedure.

The first modification of the sixth embodiment executes all the steps from S501 to S506 similar to the sixth embodiment. Subsequently, in step S601, the image supply unit 73 of the controller 70 measures the luminance of the area in which the luminance is controlled. In step S602, the image supply unit 73 of the controller 70 subsequently determines the luminance of the associated information based on the result of the luminance measured in step S601.

The luminance of the associated information (the image luminance) may be adjusted by causing the image supply unit 73 of the controller 70 to control the light intensity of light emitted by the backlight 80. The following describes an example having an LED (light emitting diode) as the backlight 80 to perform PWM (pulse width modulation) dimming. This example enables the adjustment of the luminance of the associated information by changing a pulse width (a duty ratio) for switching on or off the LED based on the instructions of the image supply unit 73 of the controller 70.

The luminance of the area in which the luminance is controlled may be measured based on a white balance detected by the sensor 60 (e.g., a CMOS camera). An optical sensor (photodiode) for measuring the luminance of the area in which the luminance is controlled may further be provided in addition to the sensor 60.

Subsequently, in step S507, the image supply unit 73 of the controller 70 supplies the associated information as images with the luminance determined in step S601 within the visual field range of the wearer 100. In step S508, the dimmer unit 74 of the controller 70 subsequently controls the transmittance of the dimmer filter 40 to make visual information other than the associated information present in the visual field to which the associated information is supplied into darker than the original luminance of the visual information. At this moment, the dimmer unit 74 controls the transmittance of the dimmer filter 40 based on the luminance of the associated information and the luminance of the visual information other than the associated information present in the visual field to which the associated information is supplied.

The first modification of the sixth embodiment measures the luminance of the area in which the luminance is controlled, and controls the luminance of the associated information and the transmittance of the dimmer filter in the area in which the luminance is controlled based on the measured result. This enables lowering the luminance of the area in which the luminance is controlled as well as adjusting the luminance of the associated information to be slightly lower within a range of securing good contrast, thereby reducing the energy consumption for projecting the associated information and increasing continuous driving time by the batteries of the display apparatus 1. Moreover, reducing the luminance of the associated information may relieve eyestrain of the wearer who wears the display apparatus 1 for a long period of time.

Second Modification of Sixth Embodiment

The following second modification of the sixth embodiment illustrates an example of specifying the visual area to which the associated information is supplied being adjacent to the visual field in which the target information exists. Note that the second modification of the sixth embodiment may appropriately omit illustrating the components identical to those already described in the sixth embodiment and the first modification of the sixth embodiment.

FIG. 23 depicts an example in which the image supply unit 73 specifies a visual field to which the associated information is supplied to be partially superimposed on the visual field in which the target information exists. In the second modification of the sixth embodiment, the image supply unit 73 may specify a visual field to which the associated information is supplied to be adjacent to the visual field in which the target information exists instead.

For example, FIG. 27 depicts an example in which the image supply unit 73 specifies a visual field 400*a* to which the associated information 400 is supplied to be adjacent to the visual field 300*a* in which the target information 300 exists. Similarly, FIG. 27 also depicts an example in which the image supply unit 73 specifies a visual field 410*a* to which the associated information 410 is supplied to be adjacent to the visual field 310*a* in which the target information 310 exists.

In the second modification of the sixth embodiment, the image supply unit 73 may specify a visual field to which the associated information is supplied to be adjacent to the visual field in which the target information exists as described above. Specifying the visual field to which the associated information is supplied to be adjacent to the visual field in which the target information exists may make the wearer of the display apparatus 1 intuitively perceive the associated information being associated with the target information similar to the example of FIG. 23.

Seventh Embodiment

The following seventh embodiment illustrates an example of causing a sensor to monitor the light intensity of external light, input a monitored result into the controller, and automatically adjusting the transmittance of the dimmer filter and the light intensity of the images at the same time based on the monitored result of the sensor and an adjustment table recorded in advance in the RAM or the like of the controller. The seventh embodiment also illustrates an example of simply and accurately creating the adjustment table based on predetermined formulas. Note that the seventh embodiment may appropriately omit illustrating the components identical to those already described in the sixth embodiment and the modifications of the sixth embodiment.

A display apparatus 2 of the seventh embodiment differs from the display apparatus 1 of the sixth embodiment (see FIG. 1) in that the display apparatus 2 of the seventh embodiment includes a sensor 60A instead of the sensor 60, and a controller 70A instead of the controller 70.

The sensor 60A employed in the display apparatus 2 of the seventh embodiment is a light intensity detector configured to detect the light intensity of external light (peripheral luminance of the display apparatus 2). Physical values for measuring the light intensity include illuminance and luminance, and the seventh embodiment employs an illuminance sensor or a luminance sensor as the sensor 60A. A specific example of the sensor 60A may be a photodiode, or the like. The sensor 60A may be attached to the front part 1a, for example.

FIG. 28 depicts a relationship between the light intensity A of external light, the light intensity B of the transmitted light that is dimmed by the dimmer filter 40, and the light intensity C of the images transmitted from the image display part 10. The relationship indicates that making the light intensity C of the images higher than the light intensity B of the transmitted light may improve clarity or definition of the displayed images. Note that making the light intensity B of the transmitted light too low may degrade the viewability of peripheral real images.

In the display apparatus 2, the sensor 60A monitors the light intensity A of the external light and inputs the monitored result into the controller 70A as illustrated in FIG. 29. The controller 70A then automatically adjust the transmittance of the dimmer filter 40 (which adjusts the light intensity B of the transmitted light) and the image luminance of the image display part 10 (the light intensity C of the images) based on the monitored result of the sensor 60A and the adjustment table recorded in advance in the RAM of the controller 70A at the same time.

Note that the transmittance of the dimmer filter 40 may be adjusted based on a time period in which the controller 70A applies a constant voltage to the dimmer filter 40. That is, the transmittance of the dimmer filter 40 may be adjusted based on the darkness of the color in the display layer 43. The darkness of the color in the display layer 43 is changed by controlling the amount of electric charges (electric current accumulated time) of the display layer 43 of the dimmer filter 40 in accordance with the time period in which the constant voltage is applied.

FIG. 30 is a graph illustrating an example of a change in the transmittance of the dimmer filter 40. FIG. 30 illustrates an example in which the display layer 43 of the dimmer filter 40 is caused to develop color by application of the constant voltage of 2 V. As is clear from FIG. 30, the constant voltage of 2 V may be applied to the dimmer filter 40 for a time period of 2 s to reduce the transmittance of the dimmer filter 40 to 30%. Similarly, the constant voltage of 2 V may be applied to the dimmer filter 40 for a time period of 5 s to reduce the transmittance of the dimmer filter 40 to 10%.

Note that the transmittance of the dimmer filter 40 may vary with time. Thus, the controller 70A may preferably be provided with a transmittance detector configured to detect the transmittance of the dimmer filter 40, allowing the controller 70A to automatically correct the transmittance of the dimmer filter 40 to a desired value based on a detected result of the transmittance detector. As a result, the display apparatus 2 having the same peripheral luminance for a long period may be able to display the images without degrading the visibility. The transmittance detector may detect the transmittance at predetermined time intervals, and the controller 70A may automatically correct the transmittance at predetermined time intervals. An example of the transmittance detector may be a photodiode.

The image luminance (the light intensity C of the images) of the image display part 10 may be adjusted by causing the controller 70A to control the light intensity of light emitted by the backlight 80. The following describes an example having an LED (light emitting diode) as the backlight 80 to perform PWM (pulse width modulation) dimming. This example enables the adjustment of the luminance of the associated information by changing a pulse width (a duty ratio) for switching on or off the LED based on the instructions of the controller 70A.

The following describes examples of adjusting the transmittance of the dimmer filter 40 and the image luminance of the image display part 10.

The inventors have deduced the following formulas (1) and (2). The following mainly describes methods of obtaining the formulas (1) and (2), and the technical significance of the formulas (1) and (2).

$$T=(C \times k)/(D \times A) \tag{1}$$

$$D=-\log((Lmax-L0)/(Lmax-Lmin)) \tag{2}$$

In the above formulas (1) and (2), T denotes the transmittance of the dimmer filter 40, C denotes the light intensity of the images, A denotes the light intensity of external light incident on an incident surface of the display apparatus 2, Lmax denotes the maximum value of the viewability level, Lmin denotes the minimum value of the viewability level, L0 denotes a threshold of the viewability level, and k denotes an image coefficient.

A sensory evaluation in visibility was conducted on multiple participants wearing the display apparatus 2 illustrated in FIG. 28 under external light of various luminance conditions. The visibility of each participant was evaluated on a scale of one to five levels with respect to the character images and photographic images by varying the transmittance of the dimmer filter 40.

FIG. 14 is a graph illustrating results of the sensory evaluation in visibility. FIG. 14 illustrates results of the character image visibility of the participants with the display apparatus 2 under the external light of 120000 lux obtained by varying the transmittance of the dimmer filter 40 to 5%, 10%, and 15%. The vertical axis of the graph indicates visibility levels of an image and the horizontal axis of the graph indicates light intensity of the image.

As illustrated in FIG. 14, the higher light intensity of the image appears to result in the higher visibility of the image, and the more blocked external light by lowering the transmittance of the dimmer filter 40 appears to result in the higher visibility of the image. The above results indicate that the visibility of the image may vary with the ratio of the light intensity B of the transmitted light and the light intensity C of the image depicted in FIG. 28.

The light intensity ratio of the light intensity C of the image (the amount of light of the image) and the light intensity B of the transmitted light (the light intensity of external light after having transmitted through the display apparatus 2) is defines as "Light intensity ratio=Light intensity C of Image/Light intensity B of Transmitted light". Note that the light intensities B and C were measured by the illuminance sensor or the luminance sensor, and values measured by the illuminance sensor or the luminance sensor were defined as the respective light intensities. In addition, the light intensity of the image was defined as the light intensity of a white solid image.

FIG. 15 is a graph re-plotting the results of FIG. 14 as the visibility levels of the image with respect to the light intensity ratio. As illustrated in FIG. 15, the visibility levels at the respective transmittances of 5%, 10%, and 15% of the dimmer filter 40 are plotted on the same curve, indicating the visibility levels being determined uniquely based on the light intensity ratio.

In addition, a similar evaluation was conducted under the external light of 1000 lux to 50000 lux. The results illustrate that the visibility levels at the respective transmittances of the dimmer filter 40 under any luminance within a range of the external light 1000 to 5000 lux are on the same curve of the visibility levels and the light intensity, indicating that the visibility levels are determined based on the light intensity ratio.

Further, as illustrated in FIG. 16, the visibility curve of the image with respect to the light intensity ratio differs between an image composed of two (black and white) gradations such as the character image and in an image composed of multiple gradations. The results indicate that the light intensity ratio needs to be increased for an image composed of intermediate gradations to improve the visibility.

The following formulas (3) and (4) were derived from the graphs of FIGS. 14 and 15 based on the results of the sensory evaluation of the visibility.

$$L=L\max-(L\max-L\min)\times\exp(-k\times\text{Light intensity ratio}) \quad (3)$$

$$\text{Light intensity ratio}=C/(A\times T) \quad (4)$$

In the above formulas (3) and (4), T denotes the transmittance of the dimmer filter 40, C denotes the light intensity of the images, A denotes the light intensity of external light incident on an incident surface of the display apparatus 2, L denotes visibility level, Lmax denotes the maximum value of the viewability level, Lmin denotes the minimum value of the viewability level, L0 denotes a threshold of the viewability level, and k denotes an image coefficient.

The threshold L of 0 in the visibility of the image may be selected based on the formulas (3) and (4) as a value applied to the visibility level L to compute the required transmittance of the dimmer filter 40 for the visibility. The results obtained are the above-described formulas (1) and (2).

The light intensity C of the image in the above-described formulas (1) and (2) indicates a value detected by the light intensity detector on the surface of the light guide plate 30 opposing the eye. However, if the light intensity detector interferes with the eye, it may be undesired for the light intensity detector to be constantly placed on the surface of the light guide plate 30 opposing the eye. The light intensity detector was thus placed on the surface of the light guide plate 30 opposing the eye at the time of displaying the white solid image on the entire surface to measure the relationship between the drive voltage of the light source of the image display part 10 and the detected value of the light intensity detector, as illustrated in FIG. 17. Note that the illuminance sensor may be suitable for the light intensity detector in this example; however, the luminance sensor may also be used instead.

As a result, the light intensity detector is not necessarily placed on the surface of the light guide plate 30 opposing the eye to compute the value of the light intensity C of the image of the image display part 10 based on the value of the drive voltage of the light source. Specifically, the operational circuit may use FIG. 17 as table data to compute the light intensity C of the image of the image display part 10 based on the drive voltage of the light source of the image display part 10. Note that in this case of creating the table data of FIG. 17, a sensor identical to the sensor 60A configured to detect the light intensity of the external light needs to be used.

The visibility of the image in the above-described formulas (1) and (2) may be on a scale of one to five levels or on a scale of one to ten levels. For example, the maximum value may be "5" and the minimum value may be "1" in the visibility of the image on the scale of one to five levels. The preferable threshold of the viewability of the image may be appropriately 80% of the maximum value; however, the preferable threshold on the scale of one to five levels may be "4".

The image coefficient k in the formulas (1) and (2) is determined based on the image to be displayed; the preferable image coefficient k for the character image may be in a range of 15 to 50, and the preferable image coefficient k for the photographic image may be in a range of 5 to 15.

The adjustment table for determining the transmittance of the dimmer filter 40 may be simply and accurately created by the above-described formulas (1) and (2) forming a matrix of the detected values of the light intensity detector and the drive voltage values of the light source of the image display part 10. Thus, the visibility of the images may be improved.

The visibility was unaffected even though a value with respect to the transmittance of the dimmer filter 40 computed by the formulas (1) and (2) increased or decreased within a range of ±20%. Thus, the transmittance of the dimmer filter 40 does not necessarily match the value computed by the formulas (1) and (2) in the adjustment table completely, and the transmittance computed by the formulas (1) and (2) within an error range of ±20% may be suitable for the transmittance of the dimmer filter 40.

Example 7-1

In an example 7-1, the display apparatus 2 having a configuration of FIG. 28 was created based on the following conditions.

Display apparatus main body (the front part 1a and the temple part 1b): MOVERIO BT-200 (produced by Seiko Epson Corp.)

Dimmer filter 40: Electrochromic element having properties of FIG. 30

Sensor 60A: Analog ambient light sensor IC (BH1600FVC produced by ROHM Co., Ltd.)

Displayed image: white character image (20 point character)

A=a signal voltage value of the sensor 60A, Lmax=5, Lmin=1, L0=4, k=40, and C=light intensity were obtained based on the formulas (1) and (2) using a sensor identical to the sensor 60A as the light intensity detector to create the table data of FIG. 17 as the signal voltage values of the sensor 60A converted from the drive voltage values of the light source of the image display part 10. The adjustment table (FIG. 18) of the transmittance of the dimmer filter 40 created was composed of a matrix of the light intensity of the external light (voltage values of the sensor signal 60A) and the light intensity of the image (drive voltage values of the light source of the image display part 10). The adjustment table (FIG. 18) was used as the adjustment table for the controller 70A illustrated in FIG. 29. The EC drive voltage in FIG. 18 is a drive voltage of the dimmer filter 40.

FIG. 19 illustrates a relationship between the output voltage value of the sensor 70A and the external light measured by a commercially available illuminometer (produced by Konica Minolta). FIG. 20 illustrates a relationship between the drive voltage the dimmer filter 40 driven by the electrochromic element and the transmittance of the dimmer filter 40. These table data illustrated in FIGS. 19 and 20 may also be used within the controller 70A.

The character image was displayed in the open air of 10000 lux by the display apparatus 2 having the controller 70A illustrated in FIG. 29. The character image was controlled based on the created adjustment table of FIG. 18, and displayed in the open air to activate the dimmer filter 40 based on the light intensity of the external light. This made the character image clearly visible to the wearer of the display apparatus 2.

Example 7-2

The example 7-2 was configured in a manner similar to the example 7-1 except that the "k=10" was applied to the formulas (1) and (2), and a scenery image (256 gradations) was applied to the displayed image.

The adjusting table was created in a manner similar to the example 7-1. The scenery image was displayed by the display apparatus 2 having the controller 70A illustrated in FIG. 29. The scenery image was controlled based on the created adjustment table, and displayed in the open air of 10000 lux. This had activated the dimmer filter 40 based on the light intensity of the external light, making the scenery image clearly visible to the wearer of the display apparatus 2.

Eighth Embodiment

An eighth embodiment illustrates an example in which the operational circuit creates the adjustment table as required in accordance with a signal from the sensor 60A based on the formulas (1) and (2). Subsequently, the transmittance of the dimmer filter 40 and the light intensity of the image are automatically adjusted based on the created adjustment table to make the visibility (viewability) of the image greater than or equal to the threshold. Note that the eighth embodiment may appropriately omit illustrating the components identical to those already described in the above embodiments and modifications.

FIG. 21 is a block diagram illustrating an example of the controller configured to perform automatic adjustment. The controller has a circuit configuration example to control, based on the formulas (1) and (2), the detected value of the light intensity of the sensor 60A, the voltage for determining light intensity of the light source of the image display part based on the detected value, and the voltage for determining the transmittance of the dimmer filter 40.

The controller 70A includes a sensor voltage detector circuit 75, an image recognition processor circuit 76, a light source voltage controller circuit 77, a dimmer filter voltage controller circuit 78, and an operational circuit 79. The sensor voltage detector circuit 75 is configured to detect a signal voltage value corresponding to the light intensity of the sensor 60A of the display apparatus 2 and output a detected result to the operational circuit 79.

The image recognition processor circuit 76 is configured to recognize types of the images (e.g., the character image, the photographic image, and video) based on the image data, and output the recognized type of the image to the operational circuit 79. The light source voltage controller circuit 77 is configured to control the drive voltage of the light source of the image display part 10 based on the instructions from the operational circuit 79. The dimmer filter voltage controller circuit 78 is configured to change the drive voltage of the dimmer filter 40 based on the instructions from the operational circuit 79 to control the transmittance of the dimmer filter 40.

The operational circuit 79 is configured to perform computational operations based on the formulas (1) and (2), in accordance with the signals input from the sensor voltage detector circuit 75 and the image recognition processor circuit 76, and compute the optimal drive voltage of the light source of the image display part 10 and the drive voltage of the dimmer filter 40 to create an adjustment table as required. The operational circuit 79 is configured to subsequently transmit the instructions to the light source voltage controller circuit 77, and the dimmer filter voltage controller circuit 78, based on the created adjustment table. The light source voltage controller circuit 77 is configured to automatically adjust the light intensity of the light source of the image display part 10 in multiple stages, and the dimmer filter voltage controller circuit 78 is configured to automatically adjust the transmittance of the dimmer filter 40 in multiple stages.

The configuration of the eighth embodiment may acquire the light intensity A of the external light from the sensor 60A, create the adjustment table based on the formulas (1) and (2) as required, and automatically adjust the transmittance of the dimmer filter 40 and the light intensity of the image based on the created adjustment table. This configuration does not require a large number of adjustment tables in accordance of different light intensities of the external light to reduce the storage capacity of the controller 70A as well as reducing the size of the process circuit. In addition, this configuration may significantly increase the process speeds for automatically adjusting the transmittance the dimmer filter 40 and the light intensity of the image of the image display part 10.

Example 8-1

The example 8-1 was configured in a manner similar to the example 7-1 except that the display apparatus 2 employed the controller 70A of FIG. 21. Specifically, the operational circuit 79 computed the drive voltage of the dimmer filter 40 and the drive voltage of the light source of the image display part 10 to obtain the visibility that was most suitably adapted to the external light, based on the signal value input from the sensor 60A and the signal value input from the image recognition processor circuit 76. The operational circuit 79 subsequently adjusted the transmittance of the dimmer filter 40 and the luminance of the image to the optimal ones of the transmittance and the luminance. Note that the computation performed by the operational circuit 79 was programmed to refer to data of the table of FIG. 19 and data of the table of FIG. 20.

The character image was displayed inside the room of 1000 lux, under a tree of 10000 lux, and under the blazing sun of 40000 lux, based on the light intensity of the external light. The results illustrate that the transmittance of the dimmer filter 40 and the luminance of the image were automatically adjusted based on the light intensity of the external light, and the character image displayed was clearly visible under the above three conditions.

Example 8-2

The example 8-2 was configured in a manner similar to the example 8-1 except that the "k=10" was applied to the formulas (1) and (2), and a scenery image (256 gradations) was applied to the displayed image.

The scenery image was displayed inside the room of 1000 lux, under a tree of 10000 lux, and under the blazing sun of 40000 lux, based on the light intensity of the external light. The results illustrate that the transmittance of the dimmer filter 40 and the luminance of the image were automatically adjusted based on the light intensity of the external light, and the scenery image displayed was clearly visible under the above three conditions.

Ninth Embodiment

A ninth embodiment illustrates an example in which the dimmer filter 40 starts being controlled before the image is displayed on the image display part 10. Note that the ninth embodiment may appropriately omit illustrating the components identical to those already described in the above embodiments and modifications.

The human eye has the ability to become adjusted to various levels of darkness and light, namely, dark adaptation and light adaptation. The dark adaptation indicates that the sensitivity of the eye in a bright environment quickly adapts to a dark environment when the bright environment changes to the dark environment. The dark adaptation results from the pupillary light reflex (PLR) or photopupillary reflex and light sensitivity of the retina, and it takes a predetermined time period for the eye to adapt to darkness from bright environment. Thus, when a participant (wearer) moves from a bright place to a dark place, the wearer may fail to recognize the surrounding scene in the dark place.

When a participant constantly wears the display apparatus 2 in the open-air clear weather, the dimmer filter 40 constantly becomes activated to dim highly intensive light entering into the eye, providing the wearer with good visibility of the image. However, when the participant who occasionally wears the display apparatus 2 stays in the open-air clear weather for a long time, the eye needs to have some time to adapt to the darkness. As a result, the participant may fail to clearly recognize the image for a while after the dimmer filter 40 becomes activated.

Thus, the display apparatus 2 may be tailored to the participant who occasionally wears the display apparatus 2 under the bright environment as follows. That is, the display apparatus 2 is configured to encourage the participant to switch the power of the display apparatus 2 on when using the display apparatus 2 to only activate the dimmer filter 40 without displaying the image within a time period while the sensitivity of the eye becomes adapted to the darkness. The display apparatus 2 is configured to subsequently display an image after the eye has adapted to the darkness. In this embodiment, such functions may be combined into the controller 70A of the display apparatus 2.

The suitable time for only controlling the dimmer filter 40 without displaying the image at the time where the participant has worn the display apparatus 2 may be approximately one minute. The preferable transmittance of the dimmer filter 40 at this time may be the value closest to the minimum, that is, in a range of 2 to 5%. After the time for only controlling the dimmer filter 40 without displaying the image has elapsed, the transmittance of the dimmer filter 40 and the light intensity of the light source of the image display part 10 based on the light intensity of the external light to allow the participant (wearer) to see the image clearly.

In the ninth embodiment, the dimmer filter 40 initially functions to block the external light incident on the eye to display the image at a timing at which the eye becomes adapted to the dark place, which meets the dark adaptation of the human eye, and improves the visibility under the extremely bright environments such as sunny summer conditions.

Example 9-1

An example 9-1 was configured in a manner similar to the example 8-1 except that the display apparatus 2 was programmed to activate the dimmer filter 40 to automatically become activated for one minute with the transmittance of 5% when a participant (wearer) had worn the display apparatus 2 and turned a main switch of the display apparatus 2 on.

When a participant (wearer) wore the display apparatus 2 and turned a main switch of the display apparatus 2 on, the dimmer filter 40 was immediately activated and served as slightly darker sunglasses to block the external incident light for one minute. After one minute, the photographic image, which had been obtained by adjusting the transmittance of the dimmer filter 40 and the light intensity of the light source of the image display part 10 based on the light intensity of the external light, was displayed. This had allowed the participant to see the image clearly.

Note that by comparison, the participant wore the display apparatus 2 in the open-air clear weather with the external light of 5000 lux similar to the above, except that the display apparatus 2 was programmed not to immediately activate the dimmer filter 40 when the participant had turned on the main switch. In this case, after the participant turned on the switch and a certain time had elapsed, the photographic image, which had been obtained by adjusting the transmittance of the dimmer filter 40 and the light intensity of the light source of the image display part 10 based on the light intensity of the external light, was displayed. The results illustrate that the photographic image was not clearly visible to the participant for 10 minutes.

Tenth Embodiment

A tenth embodiment illustrates an example in which the gradations of the image displayed on the image display part is changed based on the light intensity of the external light and the transmittance of the dimmer filter 40. Note that the tenth embodiment may appropriately omit illustrating the components identical to those already described in the embodiments and the modifications.

Under the bright environment such as the open-air clear weather, the transmittance of the dimmer filter 40 may need to be significantly reduced in order for each participant wearing the display apparatus 2 to clearly see (obtain good visibility of) the displayed image. For example, the visibility experiments conducted in the past had demonstrated that the human eye fails to visually recognize typical photographic images under the environment of 60000 lux unless the transmittance of the dimmer filter 40 is approximately 2%.

Conversely, with the dimmer filter 40 having the transmittance of 2%, the participants will see the image but may have difficulty in seeing the ambient environment, which may cause the participants to have a problem with carrying out tasks or walking while viewing the image. On the other hand, the visibility experiments conducted in the past had demonstrated that when the character image was displayed under the environment of 60000 lux, the participants were able to see or recognize the characters with the dimmer filter 40 having the transmittance of 10%. With the transmittance of 10%, the participants will not have a problem with walking or carrying out tasks.

One of the main differences between the character image and the photographic image is the number of gradations; the character image has two gradations (binary) and the photographic image has 256 gradations. A large number of gradations lowers the contrast of the image, resulting in low visibility. To improve the visibility, the controller 70A of the display apparatus 2 in this embodiment further includes an image correcting unit configured to correct a gamma value of the image displayed on the image display part 10 based on the light intensity A of the external light and the transmittance of the dimmer filter 40.

When the purpose of looking at photographs or graphic images with the display apparatus 2 is to navigate by a map while walking or checking the task instructions, the reproducibility of the image is not of importance; users may need only to verify the point spots on the route to the destination or the main points of the task instructions. The results illustrate that the participants were able to recognize the point spots on the route to the destination or the main points of the task instructions in the open-air clear weather of 60000 lux by making the contrast of the photographs or graphics extremely high and then lowering, for example, the 256 gradations to be 3 to 5 gradations.

The image recognition processor circuit 76 of FIG. 21 is provided with a function to change the number of gradations of the image based on the light intensity A of the external light and the transmittance of the dimmer filter 40. For example, the image recognition processor circuit 76 may lower 256 gradations to 10 gradations when the external light has the light intensity of 10000 lux, the dimmer filter 40 has the transmittance of 10%, and the original image has 256 gradations. Alternatively, the image recognition processor circuit 76 may lower 256 gradations to 4 gradations when the external light has the light intensity of 60000 lux, the dimmer filter 40 has the transmittance of 5%, and the original image has 256 gradations. The light intensity A of the external light, the transmittance of the dimmer filter 40, and the number of gradations to be reduced may be stored as a table.

This configuration may improve the visibility of a halftone image under the extremely bright external light with the dimmer filter 40 having the transmittance range (5% or more) of allowing the users to see the ambient environment, thereby providing the users with the visibility of (able to view) both the ambient environment and the displayed image.

Example 10-1

An example 10-1 was configured in a manner similar to the example 8-1 except that the display apparatus 2 was programmed to change the number of gradations of the image to be displayed based on the luminance of the external light.

The photograph illustrated in FIG. 22A was determined to be acceptable when the participant wearing the display apparatus 2 was able to recognize a part of the original photograph (256 gradations) enclosed by a broken line circle $D_1$ under an environment of predetermined luminance.

The photograph illustrated in FIG. 22B was obtained by the image recognition processor circuit 76 that had reduced the gradation of the original photograph to 40 gradations based on the signals from the sensor 60A under an environment having the external light of 50000 lux. The participant wore the display apparatus 2 in the open-air clear weather with the external light of 5000 lux, and the image was displayed. The displayed image was the photographic image illustrated in FIG. 22B, which had been obtained by adjusting the transmittance of the dimmer filter 40 and the light intensity of the light source of the image display part 10 based on the light intensity of the external light, and the participant was able to clearly recognize and see a part of the displayed image enclosed by a broken line circle $D_2$.

Further, by comparison, the photographic image illustrated in FIG. 22A was displayed in the open-air clear weather having the external light of 50000 lux. The results illustrate that the participant failed to recognize what was presented in the part of the displayed image enclosed by the broken line circle $D_1$.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats.

Advantageous Effect of the Invention

The disclosed techniques may provide a head-mounted display apparatus and a method for displaying images on the head-mounted display apparatus capable of reducing energy consumption without degrading visibility and viewability of the wearer of the head-mounted display apparatus.

The disclosed techniques may further provide a head-mounted display apparatus and a method for displaying images on the head-mounted display apparatus capable of improving the contrast of the images supplied and capable of preventing visibility and viewability of visual information other than the supplied images from degrading.

REFERENCE SIGNS LIST 1 display apparatus
1a front part
1b temple part
10 image display part
20 optical part
21 lens
22 mirror
30 light guide plate
40 dimmer filter
41 display substrate
42 titanium oxide particle film
43 display layer
44 spacer
45 counterpart substrate
50 half mirror
60, 60A sensor
70, 70A controller
71 visual field specifying unit
72 associated information generator unit
73 image supply unit
74 dimmer unit
75 sensor voltage detector circuit
76 image recognition processor circuit
77 light source voltage controller circuit
78 dimmer filter voltage controller circuit
79 operational circuit
80 backlight
90 power supply
100 wearer
100L left eye
200 visual field
300, 310 target information
300a, 310a visual field in which target information exists
400, 410 associated information
400a, 410a visual field to which associated information is supplied The present application is based on and claims the benefit of priority of Japanese Priority Application No. 2015-004246 filed on Jan. 13, 2015, Japanese Priority Application No. 2015-010958 filed on Jan. 23, 2015, Japanese Priority Application No. 2015-199416 filed on Oct. 7, 2015, and Japanese Priority Application No. 2015-199417 filed on Oct. 7, 2015, the entire contents of which are hereby incorporated herein by reference.

The invention claimed is:

1. A head-mounted display apparatus comprising:
an image display part configured to display an image;
an optical unit configured to lead the image to an eye of a wearer of the display apparatus;
a light intensity detector configured to detect light intensity of external light;
a dimmer filter configured to vary transmittance to adjust the intensity of the external light reaching the eye of the wearer; and
a controller configured to adjust the transmittance of the dimmer filter and the light intensity of a light source of the image display part based on the light intensity of the external light obtained by the light intensity detector,
wherein the transmittance of the dimmer filter has a value within a range of ±20% with respect to T calculated by the following formulas (1) and (2), where $$T = (C \times k)/(D \times A) \quad (1)$$

$$D = -\log((L\max - L0)/(L\max - L\min)) \quad (2),$$

wherein T denotes the transmittance of the dimmer filter, C denotes the light intensity of the image, A denotes the light intensity of the external light incident on an incident surface of the display apparatus, Lmax denotes a maximum value of viewability, Lmin denotes a minimum value of the viewability, L0 denotes a threshold of the viewability, and k denotes an image coefficient, wherein the controller stores an adjustment table in advance, the adjustment table indicating a relationship between the light intensity of the external light, the transmittance of the dimmer filter, and the light intensity of the light source of the image display part, and adjusts the transmittance of the dimmer filter and the light intensity of the light source of the image display part based on the adjustment table, wherein the controller includes a function to adjust the transmittance of the dimmer filter and the light intensity of the light source of the image display part in a plurality of stages, and automatically adjusts the transmittance of the dimmer filter and the light intensity of the light source of the image display part, based on information on the light intensity of the external light obtained by the light intensity detector and the adjustment table, wherein the controller creates the adjustment table as required in accordance with a signal from the light intensity detector based on the formulas (1) and (2), and wherein the controller automatically adjusts the transmittance of the dimmer filter and the light intensity of the light source of the image display part based on the created adjustment table to set the viewability at a level higher than or equal to a threshold.

2. The head-mounted display apparatus as claimed in claim 1, wherein
when the light intensity of the external light is within a first light intensity range, the controller maintains the light intensity of the light source of the image display part constant, and gradually reduces the transmittance of the dimmer filter as the light intensity of the external light becomes higher, and wherein
when the light intensity of the external light is within a second light intensity range higher than the first light intensity range, the controller maintains the transmittance of the dimmer filter constant, and gradually increases the light intensity of the light source of the image display part as the light intensity of the external light becomes higher.

3. The head-mounted display apparatus as claimed in claim 2, wherein
the transmittance of the dimmer filter is fixed to a minimum value in the second light intensity range.

4. The head-mounted display apparatus as claimed in claim 1, wherein
the controller stores two or more adjustment tables, and the wearer is allowed to select a desired one of the adjustment tables.

5. The head-mounted display apparatus as claimed in claim 1, wherein
the controller starts controlling the dimmer filter before displaying the image on the image display part.

6. The head-mounted display apparatus as claimed in claim 1, wherein
the controller changes the number of gradations of the image displayed on the image display part based on the light intensity of the external light detected by the light intensity detector and the transmittance of the dimmer filter.

7. The head-mounted display apparatus as claimed in claim 1, further comprising:
a transmittance detector configured to detect the transmittance of the dimmer filter, wherein
the controller corrects the transmittance of the dimmer filter based on a detected result of the transmittance detector.

8. The head-mounted display apparatus as claimed in claim 1, further comprising:
a single power supply is used as a power supply to drive the image display part and as a power supply to drive the dimmer filter.

9. The head-mounted display apparatus as claimed in claim 1, wherein
the dimmer filter includes an electrochromic element.

* * * * *